US009684994B2

United States Patent
Vesely et al.

(10) Patent No.: US 9,684,994 B2
(45) Date of Patent: Jun. 20, 2017

(54) MODIFYING PERSPECTIVE OF STEREOSCOPIC IMAGES BASED ON CHANGES IN USER VIEWPOINT

(71) Applicant: ZSPACE, INC., Sunnyvale, CA (US)

(72) Inventors: Michael A. Vesely, Santa Cruz, CA (US); Nancy L. Clemens, San Lorenzo, CA (US); Alan S. Gray, San Jose, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/074,233

(22) Filed: Mar. 18, 2016

(65) Prior Publication Data

US 2016/0267707 A1  Sep. 15, 2016

Related U.S. Application Data

(63) Continuation of application No. 14/268,386, filed on May 2, 2014, now Pat. No. 9,292,962, which is a
(Continued)

(51) Int. Cl.
*G06T 15/20* (2011.01)
*G06T 15/06* (2011.01)
*G06T 15/30* (2011.01)

(52) U.S. Cl.
CPC ............ *G06T 15/20* (2013.01); *G06T 15/06* (2013.01); *G06T 15/30* (2013.01); *G06T 2200/04* (2013.01); *G06T 2215/16* (2013.01)

(58) Field of Classification Search
CPC ......... G06T 15/06; G06T 15/20; G06T 15/30; G06T 2200/04; G06T 2215/16; G06F 3/011
See application file for complete search history.

(56) References Cited

U.S. PATENT DOCUMENTS 1,592,034 A   7/1926  Macy
4,182,053 A   1/1980  Allen
(Continued)

FOREIGN PATENT DOCUMENTS

GB       2396421       6/2004

OTHER PUBLICATIONS

Maneesh Agrawala, Andrew C. Beers, Bernd Frohlich, Pat Hanrahan; "The Two-User Responsive Workbench: Support for Collaboration Through Individual Views of a Shared Space"; Proceedings of the 24th Annual Conference on Computer Graphics and Interactive Techniques; 1997 (6 pages).
(Continued)

*Primary Examiner* — Amy Hsu
(74) *Attorney, Agent, or Firm* — Meyertons Hood Kivlin Kowert & Goetzel, P.C.; Jeffrey C. Hood; Brian E. Moore

(57) ABSTRACT

Modifying perspective of stereoscopic images provided by one or more displays based on changes in user viewpoint. The one or more displays may include a first display that is provided substantially horizontal for displaying 3D horizontal perspective images and/or a second display that is provided substantially vertical for displaying text or conventional images such as 2D images, or 3D vertical perspective images. The horizontal display surface may be typically positioned directly in front of the user, and at a height of about a desktop surface so that the user can have about a 45° looking angle. The vertical display surface may be positioned in front of the user and preferably behind and above the horizontal display surface.

20 Claims, 16 Drawing Sheets

Related U.S. Application Data continuation of application No. 13/019,384, filed on Feb. 2, 2011, now Pat. No. 8,717,423, which is a continuation-in-part of application No. 11/429,829, filed on May 8, 2006, now Pat. No. 7,907,167.

(60) Provisional application No. 60/679,633, filed on May 9, 2005.

(56) References Cited

U.S. PATENT DOCUMENTS

| | | |
|---|---|---|
| 4,291,380 A | 9/1981 | Rohner |
| 4,677,576 A | 6/1987 | Berlin, Jr. |
| 4,763,280 A | 8/1988 | Robinson |
| 4,795,248 A | 1/1989 | Okada |
| 4,984,179 A | 1/1991 | Waldern |
| 5,079,699 A | 1/1992 | Tuy |
| 5,168,531 A | 12/1992 | Sigel |
| 5,237,647 A | 8/1993 | Roberts |
| 5,264,964 A | 11/1993 | Faris |
| 5,276,785 A | 1/1994 | Mackinlay |
| 5,287,437 A | 2/1994 | Deering |
| 5,327,285 A | 7/1994 | Faris |
| 5,361,386 A | 11/1994 | Watkins |
| 5,381,127 A | 1/1995 | Khieu |
| 5,381,158 A | 1/1995 | Takahara |
| 5,400,177 A | 3/1995 | Petitto |
| 5,438,623 A | 8/1995 | Begault |
| 5,442,744 A * | 8/1995 | Piech ............... G06F 17/30017 707/E17.009 |
| 5,515,079 A | 5/1996 | Hauck |
| 5,537,144 A | 7/1996 | Faris |
| 5,559,937 A | 9/1996 | Takeda |
| 5,574,835 A | 11/1996 | Duluk |
| 5,574,836 A | 11/1996 | Broemmelsiek |
| 5,588,139 A * | 12/1996 | Lanier ............... G06F 3/011 703/1 |
| 5,652,617 A | 7/1997 | Barbour |
| 5,659,969 A | 8/1997 | Butler |
| 5,686,975 A | 11/1997 | Lipton |
| 5,696,892 A | 12/1997 | Redmann |
| 5,745,164 A | 4/1998 | Faris |
| 5,760,767 A * | 6/1998 | Shore ............... G06F 3/04845 715/723 |
| 5,795,154 A | 8/1998 | Woods |
| 5,844,717 A | 12/1998 | Faris |
| 5,862,229 A | 1/1999 | Shimizu |
| 5,880,733 A | 3/1999 | Horvitz |
| 5,880,883 A | 3/1999 | Sudo |
| 5,945,985 A | 8/1999 | Babin |
| 5,956,046 A | 9/1999 | Kehlet |
| 6,028,593 A | 2/2000 | Rosenberg |
| 6,031,529 A * | 2/2000 | Migos ............... G06F 3/0481 715/783 |
| 6,034,717 A | 3/2000 | Dentinger |
| 6,061,064 A | 5/2000 | Reichlen |
| 6,064,354 A | 5/2000 | DeLuca |
| 6,069,649 A | 5/2000 | Hattori |
| 6,072,495 A | 6/2000 | Watanabe |
| 6,100,903 A | 8/2000 | Goettsche |
| 6,108,005 A | 8/2000 | Starks |
| 6,115,022 A | 9/2000 | Mayer |
| 6,125,337 A | 9/2000 | Rosenberg |
| 6,134,506 A | 10/2000 | Rosenberg |
| 6,139,434 A | 10/2000 | Miyamoto |
| 6,154,211 A | 11/2000 | Kamachi |
| 6,163,336 A | 12/2000 | Richards |
| 6,195,205 B1 | 2/2001 | Faris |
| 6,198,524 B1 | 3/2001 | Osgood |
| 6,208,346 B1 | 3/2001 | Washio |
| 6,211,848 B1 | 4/2001 | Plesniak |
| 6,222,532 B1 * | 4/2001 | Ceccarelli ............ G11B 27/107 348/E5.097 |
| 6,226,008 B1 | 5/2001 | Watanabe |
| 6,241,609 B1 | 6/2001 | Rutgers |
| 6,252,707 B1 | 6/2001 | Kleinberger |
| 6,317,127 B1 | 11/2001 | Daily |
| 6,346,938 B1 | 2/2002 | Chan |
| 6,351,280 B1 | 2/2002 | Benton |
| 6,353,457 B2 | 3/2002 | Uomori |
| 6,373,482 B1 | 4/2002 | Migdel |
| 6,374,255 B1 | 4/2002 | Peurach |
| 6,384,971 B1 | 5/2002 | Faris |
| 6,392,689 B1 | 5/2002 | Dolgoff |
| 6,431,705 B1 | 8/2002 | Linden |
| 6,452,593 B1 | 9/2002 | Challener |
| 6,466,185 B2 | 10/2002 | Sullivan |
| 6,478,432 B1 | 11/2002 | Dyner |
| 6,483,499 B1 | 11/2002 | Li |
| 6,515,657 B1 | 2/2003 | Zanelli |
| 6,529,210 B1 | 3/2003 | Rees |
| 6,556,197 B1 | 4/2003 | Van Hook |
| 6,593,924 B1 | 7/2003 | Lake |
| 6,597,375 B1 * | 7/2003 | Yawitz ............... G11B 27/034 715/723 |
| 6,614,427 B1 | 9/2003 | Aubrey |
| 6,618,049 B1 | 9/2003 | Hansen |
| 6,643,124 B1 | 11/2003 | Wilk |
| 6,654,071 B2 | 11/2003 | Chen |
| 6,680,735 B1 | 1/2004 | Seller |
| 6,690,337 B1 | 2/2004 | Mayer |
| 6,700,573 B2 | 3/2004 | Freeman |
| 6,715,620 B2 | 4/2004 | Taschek |
| 6,734,847 B1 | 5/2004 | Baldeweg |
| 6,753,847 B2 | 6/2004 | Kurtenbach |
| 6,774,869 B2 | 8/2004 | Biocca |
| 6,803,928 B2 | 10/2004 | Bimber |
| 6,827,446 B2 | 12/2004 | Beckett |
| 6,882,953 B2 | 4/2005 | D'Hooge |
| 6,897,880 B2 * | 5/2005 | Samra ............... G06F 17/241 345/581 |
| 6,898,307 B1 | 5/2005 | Harrington |
| 6,912,490 B2 | 6/2005 | Dodge |
| 6,943,754 B2 | 9/2005 | Aughey |
| 6,956,543 B2 | 10/2005 | Sato |
| 6,956,576 B1 | 10/2005 | Deering |
| 6,961,071 B2 | 11/2005 | Montagnese |
| 6,987,512 B2 | 1/2006 | Robertson |
| 7,084,838 B2 | 8/2006 | Yoon |
| 7,091,931 B2 | 8/2006 | Yoon |
| 7,102,635 B2 | 9/2006 | Shih |
| 7,131,907 B2 | 11/2006 | Miida |
| 7,133,041 B2 | 11/2006 | Kaufman |
| 7,161,615 B2 | 1/2007 | Pretzer |
| 7,164,786 B2 | 1/2007 | Katayama |
| 7,190,331 B2 | 3/2007 | Genc |
| 7,227,526 B2 | 6/2007 | Hildreth |
| 7,236,618 B1 | 6/2007 | Chui |
| 7,249,952 B2 | 7/2007 | Ranta |
| 7,259,747 B2 | 8/2007 | Bell |
| 7,292,242 B1 * | 11/2007 | Wittenbrink ............ G06T 15/30 345/421 |
| 7,310,098 B2 | 12/2007 | Ohba |
| 7,312,806 B2 | 12/2007 | Tiggs |
| 7,321,682 B2 | 1/2008 | Tooyama |
| 7,324,121 B2 | 1/2008 | Young |
| 7,330,198 B2 | 2/2008 | Yamaguchi |
| 7,353,134 B2 | 4/2008 | Cirielli |
| 7,408,546 B2 | 8/2008 | Serra |
| 7,477,232 B2 | 1/2009 | Serra |
| 7,492,362 B2 | 2/2009 | Sakagawa |
| 7,495,638 B2 | 2/2009 | Lamvik |
| 7,515,192 B2 * | 4/2009 | Sekiguchi ............ H04N 5/772 348/333.01 |
| 7,532,224 B2 | 5/2009 | Bannai |
| 7,583,252 B2 | 9/2009 | Kurtenbach |
| 7,616,228 B2 | 11/2009 | Lipton |
| 7,639,838 B2 | 12/2009 | Nims |
| 7,643,552 B2 | 1/2010 | Saishu |
| 7,663,570 B2 | 2/2010 | Uehara |
| 7,667,703 B2 | 2/2010 | Hong |
| 7,728,852 B2 | 6/2010 | Suzuki |
| 7,796,134 B2 | 9/2010 | Vesely |
| 7,812,815 B2 | 10/2010 | Banerjee |

(56) References Cited

U.S. PATENT DOCUMENTS

| | | | |
|---|---|---|---|
| 7,830,570 B2* | 11/2010 | Morita | G11B 27/031 358/479 |
| 7,843,470 B2 | 11/2010 | Bannai | |
| 7,877,689 B2* | 1/2011 | Gilley | G06Q 30/02 715/719 |
| 7,880,717 B2 | 2/2011 | Berkley | |
| 7,907,167 B2 | 3/2011 | Vesely | |
| 7,956,870 B2 | 6/2011 | Snyder | |
| 8,020,100 B2* | 9/2011 | Ubillos | G11B 27/031 715/719 |
| 3,035,635 A1 | 10/2011 | Shefi | |
| 8,112,711 B2* | 2/2012 | Ackley | G11B 19/025 715/716 |
| 8,259,076 B2 | 9/2012 | Trent | |
| 2002/0008906 A1 | 1/2002 | Tomita | |
| 2002/0163482 A1 | 11/2002 | Sullivan | |
| 2002/0174121 A1 | 11/2002 | Clemie | |
| 2002/0180727 A1 | 12/2002 | Guckenberger | |
| 2003/0011535 A1 | 1/2003 | Kikuchi | |
| 2003/0038830 A1* | 2/2003 | Bean | G11B 27/105 715/719 |
| 2004/0066376 A1 | 4/2004 | Donath | |
| 2004/0130525 A1 | 7/2004 | Suchocki | |
| 2004/0135744 A1 | 7/2004 | Bimber | |
| 2004/0169649 A1 | 9/2004 | Suzuki | |
| 2004/0189691 A1* | 9/2004 | Jojic | G06F 17/30825 715/720 |
| 2004/0196359 A1 | 10/2004 | Blackham | |
| 2005/0030308 A1 | 2/2005 | Takaki | |
| 2005/0093859 A1 | 5/2005 | Sumanaweera | |
| 2005/0212914 A1* | 9/2005 | Seto | H04N 1/00143 348/207.1 |
| 2005/0219240 A1 | 10/2005 | Vesely | |
| 2005/0219693 A1 | 10/2005 | Hartkop | |
| 2005/0219694 A1 | 10/2005 | Vesely | |
| 2005/0219695 A1 | 10/2005 | Vesely | |
| 2005/0248566 A1 | 11/2005 | Vesely | |
| 2005/0264558 A1 | 12/2005 | Vesely | |
| 2005/0264559 A1 | 12/2005 | Vesely | |
| 2005/0264857 A1 | 12/2005 | Vesely | |
| 2005/0275913 A1 | 12/2005 | Vesely | |
| 2005/0275914 A1 | 12/2005 | Vesely | |
| 2005/0275915 A1 | 12/2005 | Vesely | |
| 2005/0281411 A1 | 12/2005 | Vesely | |
| 2006/0120624 A1* | 6/2006 | Jojic | G06F 17/30843 382/284 |
| 2006/0126926 A1 | 6/2006 | Vesely | |
| 2006/0126927 A1 | 6/2006 | Vesely | |
| 2006/0221071 A1 | 10/2006 | Vesely | |
| 2006/0250390 A1 | 11/2006 | Vesely | |
| 2006/0250391 A1 | 11/2006 | Vesely | |
| 2006/0252978 A1 | 11/2006 | Vesely | |
| 2006/0252979 A1 | 11/2006 | Vesely | |
| 2007/0040905 A1 | 2/2007 | Vesely | |
| 2007/0088844 A1* | 4/2007 | Seims | H04L 29/06027 709/231 |
| 2007/0118800 A1* | 5/2007 | Moore | G06F 17/30056 715/730 |
| 2008/0155421 A1* | 6/2008 | Ubillos | G11B 27/031 715/724 |
| 2008/0165141 A1* | 7/2008 | Christie | G06F 3/044 345/173 |
| 2009/0031246 A1* | 1/2009 | Cowtan | G06Q 50/16 715/786 |
| 2010/0013757 A1* | 1/2010 | Ogikubo | G06F 3/0483 345/156 |
| 2010/0107126 A1* | 4/2010 | Lin | G11B 27/105 715/838 |
| 2010/0262912 A1* | 10/2010 | Cha | G11B 27/105 715/719 |

OTHER PUBLICATIONS

Rvo, Barr, Schroder, Laidlaw, Breen; "Responsive Workbench: Algorithms and Methodologies"; California Institute of Technology; Aug. 1998; Retrieved from the Internet: <http://www.gg.caltech.edu/workbench/intro.html> (4 pages).

Beardsley; Important Concepts from Projective Geometry; University of Edinburgh; Jan. 1995 (16 pages).

Cutler, Frohlich, Hanrahan; "Two-Handed Direct Manipulation on the Responsive Workbench"; Proceedings of the 1997 Symposium on Interactive 3D Graphics, ACM; 1997 (9 pages).

Frohlich, Tramberend, Beers, Agrawala, Baraff; "Physically-Based Manipulation on the Responsive Workbench"; Proceedings, IEEE, Jan. 2000 (7 pages).

Frohlich, Grunst, Kruger, Wesche; "The Responsive Workbench: A Virtual Working Environment for Physicians"; Computers in Biology and Medicine, Elsevier Science, Mar. 1995, vol. 25, No. 2; pp. 301-308 (8 pages).

Frohlich; (stills from video) "Physically-based Manipulation on the Responsive Workbench"; Stanford University, Jan. 2000 (12 pages).

Girling; "Stereoscopic Drawings: A Theory of 3-D Vision and Its Application to Stereoscopic Drawing"; 1990, Free Standing Projection, Chap. 2 (12 pages).

Hanrahan, Froehlich, Krueger, Agrawala, Beers, Cutler, Kornfeld; "The Responsive Workbench"; Stanford University, Nov. 1996 (23 pages).

Hughes; "An Introduction to Making Phantograms"; Jul. 7-12, 2004 (60 pages).

Vesely; "Aspects of the IZ User Interface Shown in Prior Demos"; Infinite Z, 2003 (10 pages).

U.S. Appl. No. 11/724,523, entitled "Horizontal Perspective Polarizing Media", by Michael A. Vesely and Nancy L. Clemens, filed Mar. 14, 2007 (42 pages).

U.S. Appl. No. 11/724,524, entitled "Shifted Pixel Polarized Stereoscopic Display", by Michael A. Vesely and Nancy L. Clemens, filed Mar. 14, 2007 (45 pages).

U.S. Appl. No. 11/724,525, entitled "Composite Pointer for Stereoscopic Simulation", by Michael A. Vesely and Nancy L. Clemens, filed Mar. 14, 2007 (27 pages).

William Bares, Scott McDermott, Christine Boudreaux and Somying Thainimit; "Virtual 3D Camera Composition from Frame Contraints"; University of Louisiana at Layfayette; 2000 (10 pages).

Berezin, "Electrooptic switching in oriented liquid-crystal films," Soviet Journal of Quant. Electron., vol. 3, No. 1, 1973, pp. 78-79 (2 pages).

Berman, "Basics of Stereoscopic Displays," Analyst, Insight Media, Dec. 2, 2008 (84 pages).

Berreman, "Liquid-crystal twist cell dynamics with backflow," Journal of Applied Physics, vol. 46, No. 9, Sep. 1975, pp. 3746-3751 (6 pages).

Chen, "Dynamics of twisted nematic liquid crystal pi-cells," Applied Physics Letters, vol. 80, No. 20, May 20, 2002, pp. 3721-3723 (3 pages).

Chen, "Homeotropic liquid-crystal device with two metastable states," Applied Physics Letters, vol. 74, No. 25, Jun. 21, 1999, pp. 3779-3781 (3 pages).

Chen, "The Optical Bounce Effect of the Chiral-Homeotropic Cell," ASID 1999, pp. 171-175 (5 pages).

Hubbard, "Optical-Bounce Removal and Turnoff-Time Reduction in Twisted-Nematic Displays," IEEE, 1981 (3 pages).

Jhun, "Optical Bouncing in Bistable Chiral Splay Nematic Liquid Crystal Device," Japanese Journal of Applied Physics, vol. 45, No. 1A, 2006, pp. 128-132 (5 pages).

Kelly, "Simulation of the dynamics of twisted nematic devices including flow," Journal of Applied Physics, vol. 86, No. 8, Oct. 15, 1999, pp. 4091-4095 (5 pages).

Kim, "Numerical analysis on the dynamical behavior of the TN and OCB modes including flow," Proc. of ASID'06, Oct. 8-12, pp. 179-182 (4 pages).

Kwok, "Optical Properties of Bistable Twisted Nematic LCD and Its Switching Mechanisms," 1997 (4 pages).

Lu, "Variable optical attenuator based on polymer stabilized twisted nematic liquid crystal," Optics Express, vol. 12, No. 7, Apr. 5, 2004, pp. 1221-1227 (7 pages).

(56) References Cited

OTHER PUBLICATIONS

Nicholson, "Dynamic Response of Twisted Nematic Liquid Crystal Cells to Transiently Pulsed Fields," Optics communications, vol. 40, No. 4, Jan. 15, 1982, pp. 283-287 (5 pages).
Qian, "Dynamic flow and switching bistability in twisted nematic liquid crystal cells," Applied Physics Letters, vol. 71, No. 5, Aug. 4, 1997, pp. 596-598 (3 pages).
Smith, "Direct Optical Quantification of Backflow in a 90 degree Twisted Nematic Cell," Physical Review Letters, vol. 38, No. 8, Feb. 25, 2002 (4 pages).
van Sprang, "Experimental and calculated results for the dynamics of oriented nematics with twist angles from 210 legrees to 270 degrees," Journal of Applied Physics, vol. 64, No. 10, Nov. 15, 1988, pp. 4873-4883 (11 pages).
Wang, "Bistable Twist Nematic Display d/p Ratio Optimization" 1999 (6 pages).
Xie, "Reflective Bistable Twisted Nematic Liquid Crystal Display," Japanese Journal of Applied Physics, vol. 37 Pt.1, No. 5A, 1998, pp. 2572-2575 (4 pages).
Yamashita, Measurements of Temporal Changes of TN LC Molecular Alignments on Double Block Pulse Method, Japanese Journal of Applied Physics 27 (1988), pp. 1571-1576, Abstract (1 page).

* cited by examiner

MODIFYING PERSPECTIVE OF STEREOSCOPIC IMAGES BASED ON CHANGES IN USER VIEWPOINT

PRIORITY INFORMATION

This application is a Continuation of U.S. patent application Ser. No. 14/268,386, filed on May 2, 2014, titled "Modifying Perspective of Stereoscopic Images Based on Changes in User Viewpoint," whose inventors are Michael A. Vesely, Nancy L. Clemens, and Alan S. Gray, which is a Continuation of U.S. patent application Ser. No. 13/019,384, filed on Feb. 2, 2011, now U.S. Pat. No. 8,717,423 issued on May 6, 2014, titled "Modifying Perspective of Stereoscopic Images Based on Changes in User Viewpoint," whose inventors are Michael A. Vesely, Nancy L. Clemens, and Alan S. Gray, which is a Continuation-In-Part of U.S. patent application Ser. No. 11/429,829, filed on May 8, 2006, now U.S. Pat. No. 7,907,167 issued on Mar. 15, 2011, titled "Three Dimensional Horizontal Perspective Workstation," whose inventors are Michael A. Vesely and Nancy L. Clemens, which claims priority to U.S. Provisional Patent Application Ser. No. 60/679,633, filed May 9, 2005, titled "Three Dimensional Horizontal Perspective Workstation," whose inventors are Michael Allen Vesely and Nancy Lynn Clemens, all of which are incorporated by reference in their entirety as though fully and completely set forth herein.

FIELD OF THE INVENTION

This invention relates to a three-dimensional workstation system, and in particular, to a multiple monitor hands-on computer simulator system capable of operator interaction.

DESCRIPTION OF THE RELATED ART

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g. paintings, drawings, tapestries, etc.). Scenes where a person stood upright, surrounded by trees, were rendered relatively successfully on a vertical plane. But how could they represent a landscape, where the ground extended out horizontally from where the artist was standing, as far as the eye could see?

The answer is three dimensional illusions. The two dimensional pictures must provide a number of cues of the third dimension to the brain to create the illusion of three dimensional images. This effect of third dimension cues can be realistically achievable due to the fact that the brain is quite accustomed to it. The three dimensional real world is always and already converted into a two dimensional (e.g. height and width) projected image at the retina, a concave surface at the back of the eye. And from this two dimensional image, the brain, through experience and perception, generates the depth information to form the three dimensional visual image from two types of depth cues: monocular (one eye perception) and binocular (two eye perception). In general, binocular depth cues are innate and biological while monocular depth cues are learned and environmental.

Perspective drawing, together with relative size, is most often used to achieve the illusion of three dimensional depth and spatial relationships on a flat (two dimensional) surface, such as paper or canvas. Through perspective, three dimensional objects are depicted on a two dimensional plane, but "trick" the eye into appearing to be in three dimensional space. The various types of perspectives are military, cavalier, isometric, and dimetric, as shown at the top of FIG. 1.

Of special interest is the most common type of perspective, called central perspective, shown at the bottom left of FIG. 1. Central perspective, also called one-point perspective, is the simplest kind of "genuine" perspective construction, and is often taught in art and drafting classes for beginners. FIG. 2 further illustrates central perspective. Using central perspective, the chess board and chess pieces look like three dimensional objects, even though they are drawn on a two dimensional flat piece of paper. Central perspective has a central vanishing point, and rectangular objects are placed so their front sides are parallel to the picture plane. The depth of the objects is perpendicular to the picture plane. All parallel receding edges run towards a central vanishing point. The viewer looks towards this vanishing point with a straight view. When an architect or artist creates a drawing using central perspective, he must use a single-eye view. That is, the artist creating the drawing captures the image by looking through only one eye, which is perpendicular to the drawing surface.

The vast majority of images, including central perspective images, are displayed, viewed and captured in a plane perpendicular to the line of vision. Viewing the images at an angle different from 90° would result in image distortion, meaning a square would be seen as a rectangle when the viewing surface is not perpendicular to the line of vision.

Central perspective is employed extensively in 3D computer graphics, for a myriad of applications, such as scientific, data visualization, computer-generated prototyping, special effects for movies, medical imaging, and architecture, to name just a few. One of the most common and well-known 3D computing applications is 3D gaming, which is used here as an example, because the core concepts used in 3D gaming extend to all other 3D computing applications.

There is a little known class of images called "horizontal perspective" where the image appears distorted when viewing head on, but displays a three dimensional illusion when viewing from the correct viewing position. In horizontal perspective, the angle between the viewing surface and the line of vision is preferably 45°, but can be almost any angle, and the viewing surface is preferably horizontal (thus the name "horizontal perspective"), but can be any surface, as long as the line of vision forms a non-perpendicular angle to it.

Horizontal perspective images offer realistic three dimensional illusions, but are little known primarily due to the narrow viewing location (the viewer's eyepoint has to coincide precisely with the image projection eyepoint) and the complexity involved in projecting the two dimensional image or the three dimension model into the horizontal perspective image.

The generation of horizontal perspective images requires considerably more expertise to create than conventional perpendicular images. The conventional perpendicular images can be produced directly from the viewer or camera point. One need simply open one's eyes or point the camera in any direction to obtain the images. Further, with much experience in viewing three dimensional depth cues from perpendicular images, viewers can tolerate a significant amount of distortion generated by the deviations from the camera point. In contrast, the creation of a horizontal perspective image does require much manipulation. Conventional cameras, by projecting the image into the plane perpendicular to the line of sight, would not produce a horizontal perspective image. Making a horizontal drawing requires much effort and is very time consuming. Further, since humans have limited experience with horizontal perspective images, the viewer's eye must be positioned precisely where the projection eyepoint point is in order to avoid image distortion. And therefore horizontal perspective, with its difficulties, has received little attention.

SUMMARY OF THE INVENTION

The present invention discloses a horizontal perspective workstation employing a horizontal perspective display with a computer system. The personal computer is perfectly suitable for horizontal perspective display since it is designed for the operation of one person, and the computer, with its powerful microprocessor, is well capable of rendering various horizontal perspective images to the viewer. Further, horizontal perspective offers open space display of 3D images, thus allowing the hands-on interaction of end users. Together with binaural or three dimensional audio, the horizontal perspective workstation can offer a realistic simulation of reality. Furthermore, with the addition of user biofeedback, the horizontal perspective workstation can also tailor the simulation to suit a particular user.

The present invention horizontal perspective workstation comprises at least two display surfaces, one being substantially horizontal for displaying 3D horizontal perspective images, and one being substantially vertical for text or conventional images such as 2D images, or central perspective images. The horizontal display surface is typically positioned directly in front of the user, and at a height of about a desktop surface so that the user can have about a 45° angle looking. The vertical display surface is also positioned in front of the user and preferably behind and above the horizontal display surface. The vertical display surface can be positioned directly in front or can be positioned to the left or right of the user, and preferably mounted on a moving or rotational platform so that the user can adjust its location for maximizing comfort. The horizontal and vertical display surfaces can be any display surfaces, for example, a CRT (cathode ray tube) monitor, a LCD (liquid crystal display) monitor, or a front projection or a back projection screen or surface with a plurality of projectors.

The horizontal perspective workstation further comprises a computer system with standard peripheral devices such as a keyboard, a mouse, a trackball, a stylus, a tablet, a camera, a scanner, or a printer. The connections can be wired or wireless. The positions of these peripheral devices are flexible and usually arranged for achieving the user's support and comfort.

While one eye view of 3D horizontal perspective images is possible, stereoscopic viewing is preferable. For stereoscopic viewing, the two eyes of the user need to see different projected images on the horizontal perspective display through various methods such as shutter glasses, red-and-blue eyeglasses, lenticular glasses or polarizing glasses. The preferred method is polarizing glasses where the horizontal perspective displays images and the user's eyes are respectively polarized (circularly polarized or preferably linearly polarized), thus the left eye only sees the left images and the right eye only sees the right images. If the vertical display is also polarized (as in the case of LCD monitor), the polarization needs to be adjusted so that both eyes can see the vertical images.

The horizontal perspective workstation can further comprise a binaural or 3D audio system to provide realistic sound simulation. The horizontal perspective workstation can also comprise various biofeedback devices such as brain wave, blood pressure, heart beat, respiration, perspiration, skin conductance, body temperature, muscle tension measurements and simulators for inputs and output with the users.

Further, the horizontal perspective workstation can comprise curvilinear blending display surfaces to merge the various images. The horizontal perspective workstation can adjust the images to accommodate the position of the viewer. By changing the displayed images to keep the camera eyepoint of the horizontal perspective and central perspective images in the same position as the viewer's eyepoint, the viewer's eye is always positioned at the proper viewing position to perceive the three dimensional illusion, thus minimizing the viewer's discomfort and distortion. The display can accept manual input such as a computer mouse, trackball, joystick, tablet, etc. to re-position the horizontal perspective images. The display can also automatically re-position the images based on an input device automatically providing the viewer's viewpoint location. The horizontal perspective workstation can provide a simulator system by allowing the user to manipulate the images with hands or hand-held tools.

DETAILED DESCRIPTION OF THE EMBODIMENTS

Terms

Figure 1:
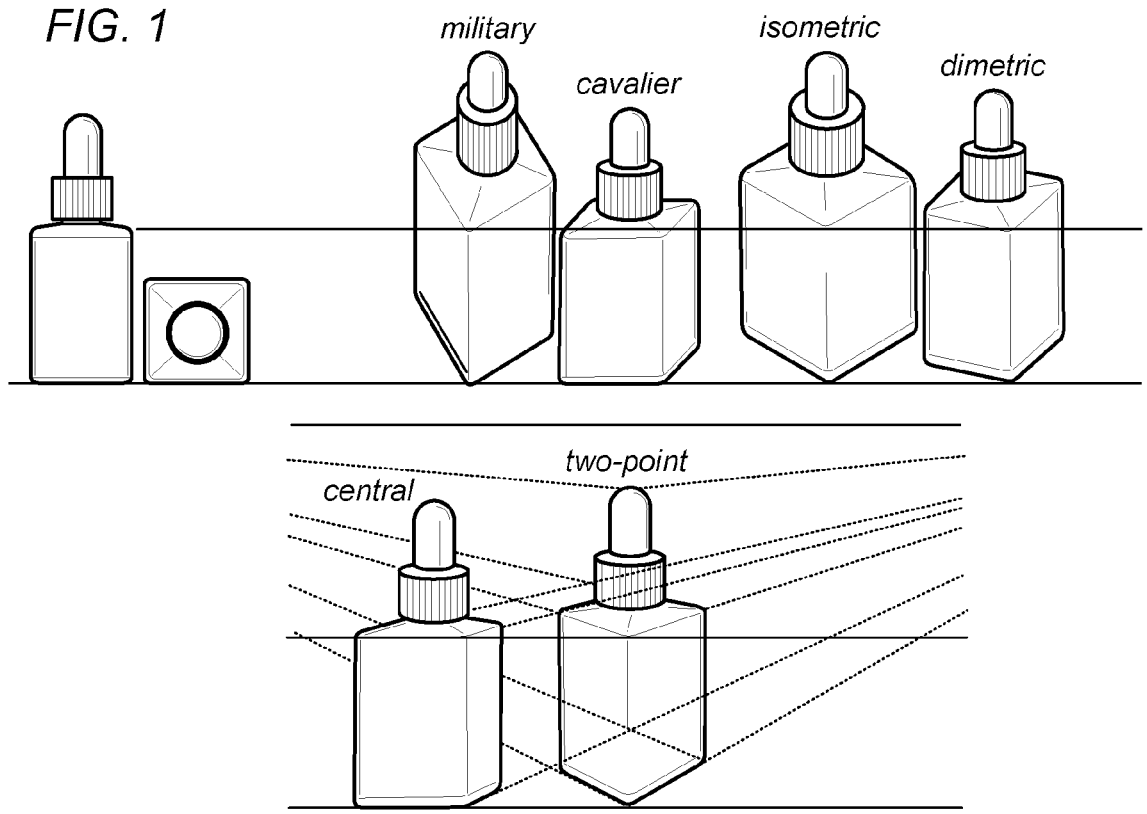
FIG. 1 shows the various perspective drawings.
Figure 2:
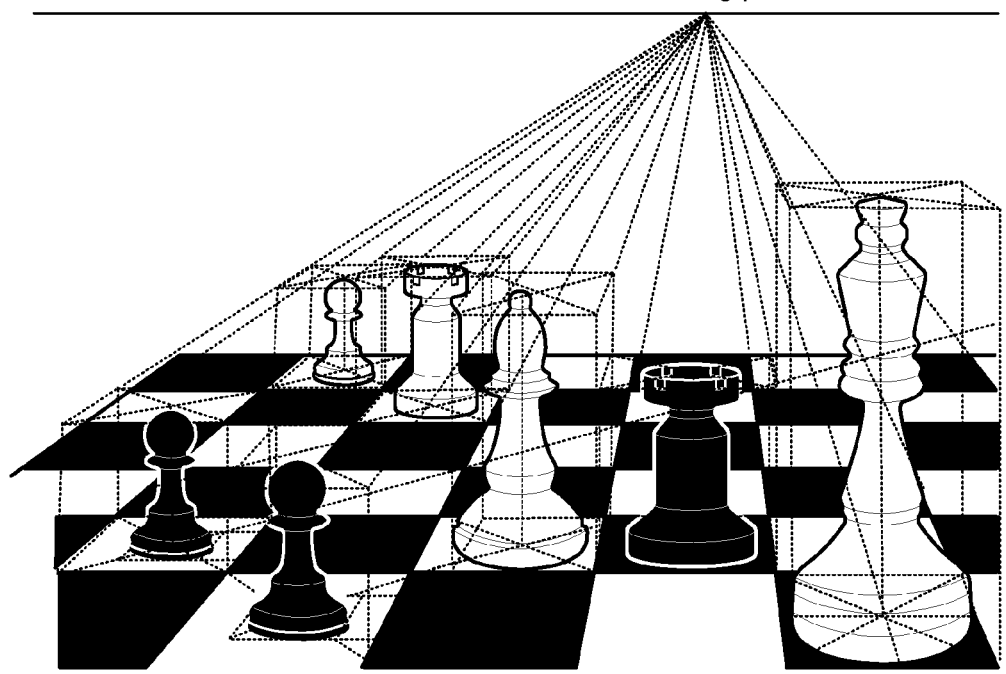
FIG. 2 shows a typical central perspective drawing.

The following is a list of terms used in the present application:

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene.

Eyepoint—the physical location (and/or orientation) of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface. More particularly, the term "horizontal perspective" may typically refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

The new and unique inventions described in this document build upon prior art by taking the current state of real-time computer-generated 3D computer graphics, 3D sound, tactile and biofeedback computer-human interfaces to a whole new level of reality and simplicity. More specifically, these new inventions enable real-time computer-generated 3D simulations to coexist in physical space and time with the end-user and with other real-world physical objects. This capability dramatically improves upon the end-user's visual, auditory and tactile computing experience by providing direct physical interactions with 3D computer-generated objects and sounds. By the addition of biofeedback, the interaction with users becomes a two-way street, meaning the computer system can be adjusted for a particular user, and the system can influence the user's perspective and behaviors.

The present invention discloses a horizontal perspective workstation comprising at least two display surfaces, one of which is capable of projecting three dimensional illusions based on horizontal perspective projection.

Figure 3:
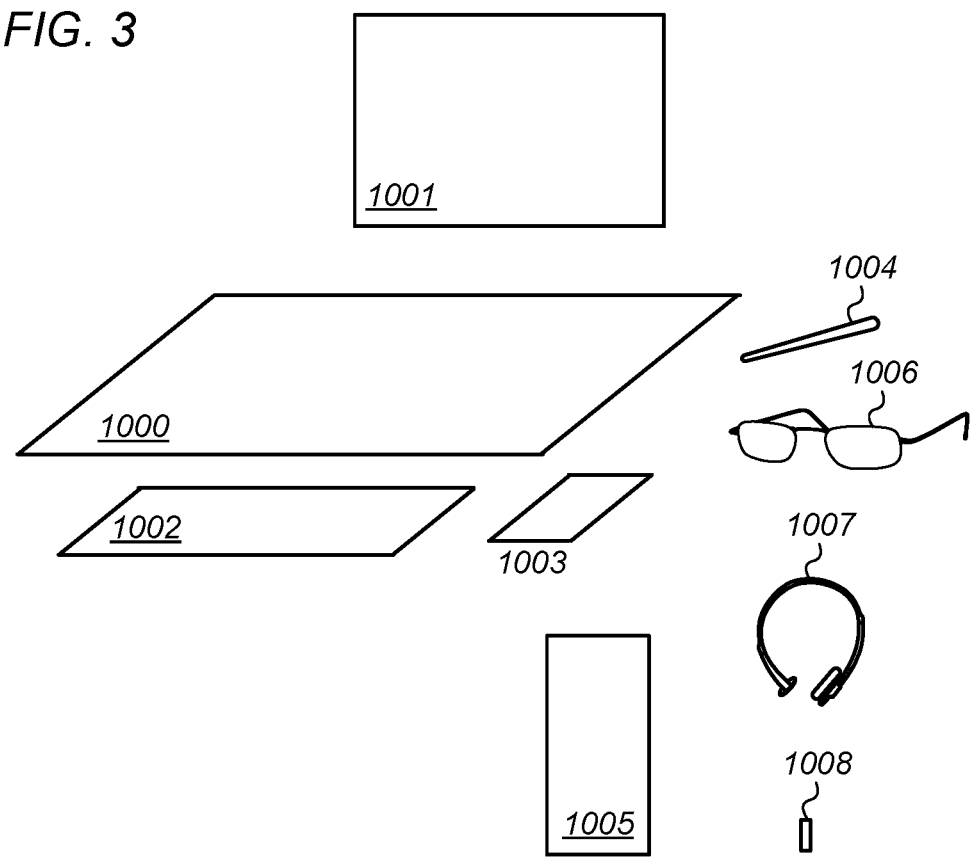
FIG. 3 shows an embodiment of the present invention horizontal perspective workstation.

FIG. 3 shows an embodiment of the present invention horizontal perspective workstation, comprising two display surfaces, a display surface 1000 being substantially horizontal for displaying 3D horizontal perspective images, and a display surface 1001 being substantially vertical for conventional images such as 2D images or central perspective images. The horizontal and vertical display surfaces can be any display surfaces, for example, a CRT (cathode ray tube) monitor, a LCD (liquid crystal display) monitor, a front projection or a back projection screen or surface with a plurality of projectors. The horizontal perspective workstation further comprises a computer system 1005 with standard peripheral devices such as a keyboard 1002, a mouse 1003, a trackball, a stylus 1004, a tablet, a camera, a scanner, or a printer. The horizontal perspective workstation further comprises a stereoscopic lens 1006 for viewing stereoscopic 3D images from the horizontal perspective display 1000.

The eyewear 1006 includes linear polarizing lenses where the polarizing angle between the two eyes is 90°. If the vertical display is also polarized as in the case of LCD monitor, the polarization needs to be adjusted so that both eyes can see the vertical images. For example, if the LCD display is 0° polarized, then the left eye could be −45° polarized and the right eye +45° polarized.

The horizontal perspective workstation can further comprise a binaural or 3D audio system such as a headphone 1007 to provide realistic sound simulation. The horizontal perspective workstation can also comprise various biofeedback devices such as brain wave electrode 1008, blood pressure, heart beat, respiration, perspiration, skin conductance, body temperature, muscle tension measurements and simulators for inputs and output with the users.

Further, the horizontal perspective workstation can comprise curvilinear blending display surfaces to merge the various images. The horizontal perspective workstation can adjust the images to accommodate the position of the viewer. By changing the displayed images to keep the camera eyepoint of the horizontal perspective and central perspective images in the same position as the viewer's eye point, the viewer's eye is always positioned at the proper viewing position to perceive the three dimensional illusion, thus minimizing the viewer's discomfort and distortion. The display can accept manual input such as a computer mouse, trackball, joystick, tablet, etc. to re-position the horizontal perspective images. The display can also automatically re-position the images based on an input device automatically providing the viewer's viewpoint location. The horizontal perspective workstation can provide a simulator system by allowing the user to manipulate the images with hands or hand-held tools.

Figure 4A:
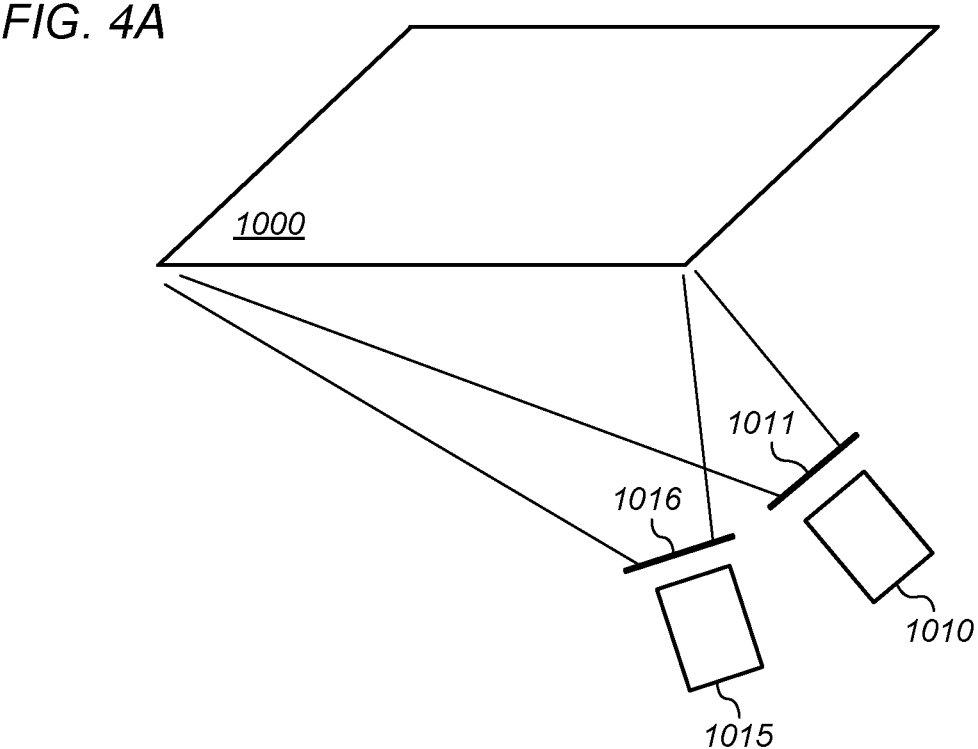
FIGS. 4A and 4B show different embodiments of the horizontal perspective display.
Figure 4B:
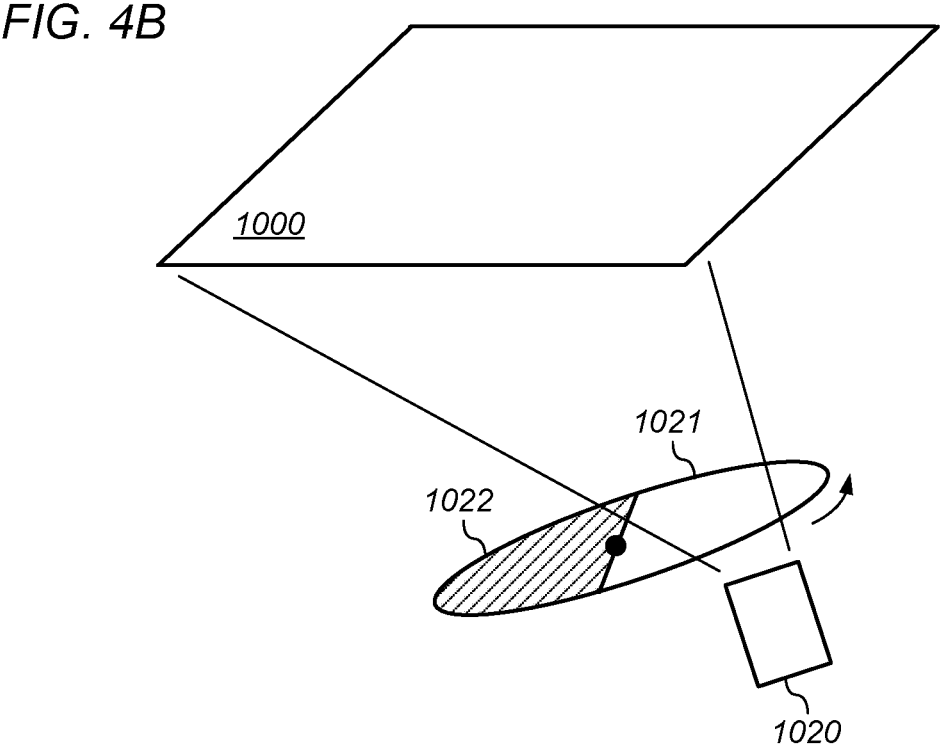

FIG. 4A shows a projector setup for the horizontal perspective display 1000. Two projectors 1010 and 1015 are calibrated to project horizontal perspective image onto the display surface 1000. The projectors are polarized with a pair of polarizing lenses 1011 and 1016 for stereoscopic image display. FIG. 4B shows another embodiment of a projector setup for the horizontal perspective display 1000 using only one projector 1020. A polarizing wheel comprising 2 polarized lenses sections 1021 and 1022 are synchronizedly spinned with the projected images. The use of one projector would save the adjustment time needed for the two projector system.

Polarizing left and right images is the preferred method of stereoscopic display since it is simple and effective. Together with the polarized left and right images, the user will need to wear eyewear that synchronizes the eyes with the displayed images. For example, if the left image is 0° linearly polarized, the right image will need to be 90° linearly polarized to ensure a complete block out of the left image to the right image and vice versa. The eyewear correspondingly carries a 0° linearly polarized for the left eye and a 90° linearly polarized for the right eye.

For stereoscopic display, the present invention comprises 3 displays, one vertical display, one left horizontal display and one right horizontal display, with the left and right horizontal display showing sequentially on the horizontal surface. If the vertical display is linearly polarized, as in the case of LCD display for improving screen picture quality, the polarizing property of the three displays will need to be synchronized to ensure proper effect. In general, the left/right horizontal display is viewable only by the left/right eye respectively, and the vertical display is viewable by both eyes. Thus, in the above example, if the left/right image is 0°/90° linearly polarized respectively, the linearly polarized vertical display would be about 45° polarized to provide similar quality to both eyes. Normally, the polarized property of the vertical display is first determined based on the chosen monitor, and then the left/right polarized property is selected so that the left/right eye see the vertical image plus only the left/right image respectively. If the vertical image is linear polarized, for example, 0° linearly polarized, the left/right image can be selected to be +/−45° (or) −/+45° linearly polarized respectively. The left/right image can also be selected to be left/right (or right/left) circularly or elliptically polarized. The left/right eye of the user's eyewear will be polarized to correspond with the left/right image respectively.

Projection screen display is the preferred method for the horizontal display since it easily allows the polarizing left and right images. Back projection is also preferred over front projection since it offers control over the environment and no interference from the user. However, while the front projection screen requires high reflection with no transmission, the back projection screen requires high transmission with no reflection and with a proper amount of diffusion since diffusion is directly related to the brightness in a back projection system. Since horizontal perspective images are viewed at a nominally 45° angle, the diffusion property of the back projection screen is markedly different from the conventional back projection screen where the images are viewed head on. Thus, a diffusion amount of at least 30° is needed for the back projection screen with 45° diffusion is preferred for a proper render of polarized left and right images. Too little diffusion will provide a brighter screen but with a lot of interference between the polarized left and right images. Too much diffusion will make the screen too dark.

The above discussion is just an example of the present invention horizontal perspective workstation. There are various obvious variations, for example, the horizontal perspective display can be a LCD monitor or a CRT monitor, and the stereoscopic viewing can be accomplished with shutter glasses or lenticular methods.

Horizontal perspective is a little-known perspective, sometimes called "free-standing anaglyph", "phantogram", or "projective anaglyph". Normally, as in central perspective, the plane of vision, at right angle to the line of sight, is also the projected plane of the picture, and depth cues are used to give the illusion of depth to this flat image. In horizontal perspective, the plane of vision remains the same, but the projected image is not on this plane. It is on a plane angled to the plane of vision. Typically, the image would be on the ground level surface. This means the image will be physically in the third dimension relative to the plane of vision. Thus, horizontal perspective can be called horizontal projection.

In horizontal perspective, the object is to separate the image from the paper, and fuse the image to the three dimensional object that projects the horizontal perspective image. Thus, the horizontal perspective image must be distorted so that the visual image fuses to form the free standing three dimensional figure. It is also essential the image is viewed from the correct eye points, otherwise the three dimensional illusion is lost. In contrast to central perspective images which have height and width and project an illusion of depth, and therefore the objects are usually abruptly projected and the images appear to be in layers, the horizontal perspective images have actual depth and width and illusion gives them height, and therefore there is usually a graduated shifting so the images appear to be continuous.

Figure 5A:
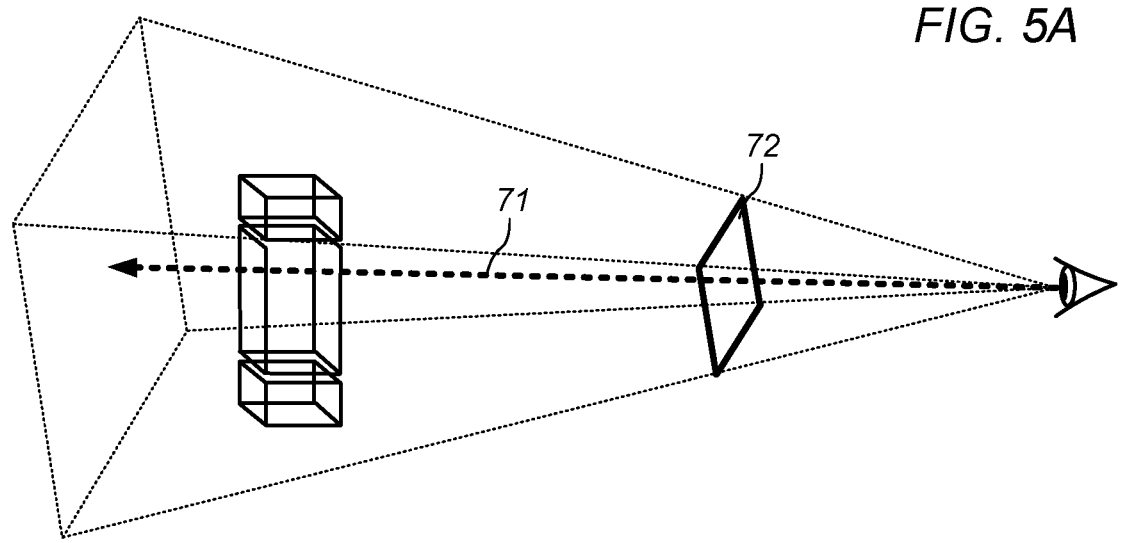
FIGS. 5A and 5B show a comparison of central perspective (FIG. 5A) and horizontal perspective (FIG. 5B).
Figure 5B:
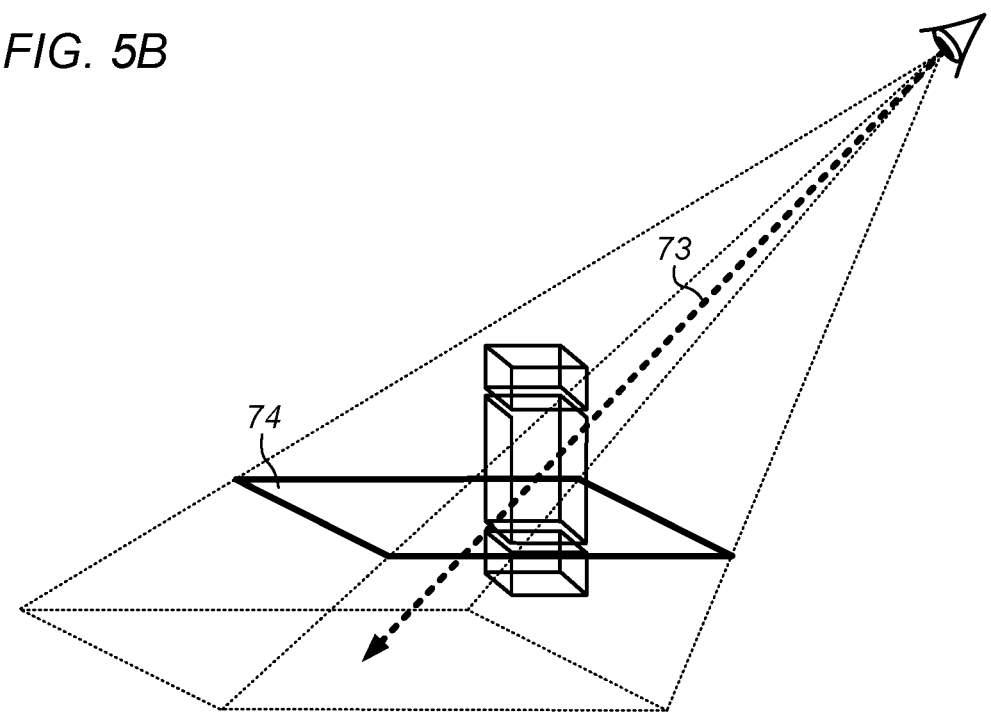

FIG. 5 compares key characteristics that differentiate central perspective and horizontal perspective. Image A shows key pertinent characteristics of central perspective, and Image B shows key pertinent characteristics of horizontal perspective.

In other words, in Image A, the real-life three dimensional object (three blocks stacked slightly above each other) was drawn by the artist closing one eye, and viewing along a line of sight perpendicular to the vertical drawing plane. The resulting image, when viewed vertically, straight on, and through one eye, looks the same as the original image.

In Image B, the real-life three dimensional object was drawn by the artist closing one eye, and viewing along a line of sight 45° to the horizontal drawing plane. The resulting image, when viewed horizontally, at 45° and through one eye, looks the same as the original image.

One major difference between the central perspective shown in Image A and the horizontal perspective shown in Image B is the location of the display plane with respect to the projected three dimensional image. In the horizontal perspective of Image B, the display plane can be adjusted up and down, and therefore the projected image can be displayed in the open air above the display plane, i.e., a physical hand can touch (or more likely pass through) the illusion, or it can be displayed under the display plane, i.e., one cannot touch the illusion because the display plane physically blocks the hand. This is the nature of horizontal perspective, and as long as the camera eyepoint and the viewer eyepoint are at the same place, the illusion is present. In contrast, in central perspective of Image A, the three dimensional illusion is likely to be only inside the display plane, meaning one cannot touch it. To bring the three dimensional illusion outside of the display plane to allow the viewer to touch it, the central perspective would need an elaborate display scheme such as surround image projection and large volume.

Figure 6:
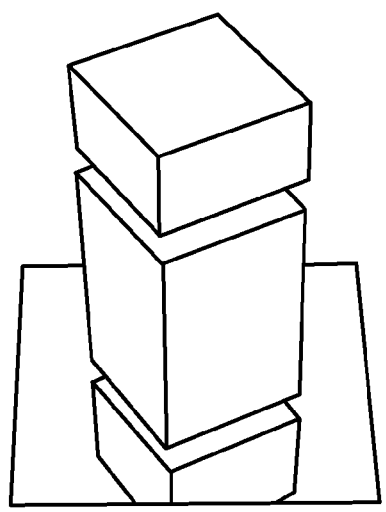
FIG. 6 shows the central perspective drawing of three stacking blocks.
Figure 7:
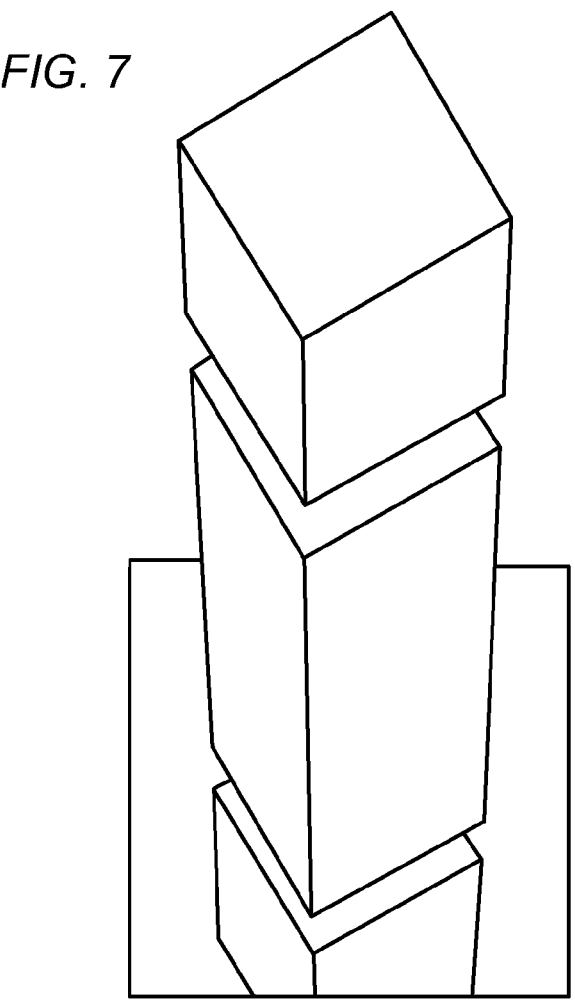
FIG. 7 shows the horizontal perspective drawing of three stacking blocks.

FIGS. 6 and 7 illustrate the visual difference between using central and horizontal perspective. To experience this visual difference, first look at FIG. 6, drawn with central perspective, through one open eye. Hold the piece of paper vertically in front of you, as you would a traditional drawing, perpendicular to your eye. You can see that central perspective provides a good representation of three dimensional objects on a two dimension surface.

Now look at FIG. 7, drawn using horizontal perspective, by sifting at your desk and placing the paper lying flat (horizontally) on the desk in front of you. Again, view the image through only one eye. This puts your one open eye, called the eye point at approximately a 45° angle to the paper, which is the angle that the artist used to make the drawing. To get your open eye and its line-of-sight to coincide with the artist's, move your eye downward and forward closer to the drawing, about six inches out and down and at a 45° angle. This will result in the ideal viewing experience where the top and middle blocks will appear above the paper in open space.

Again, the reason your one open eye needs to be at this precise location is because both central and horizontal perspective not only define the angle of the line of sight from the eye point; they also define the distance from the eye point to the drawing. This means that FIGS. 6 and 7 are drawn with an ideal location and direction for your open eye relative to the drawing surfaces. However, unlike central perspective where deviations from position and direction of the eye point create little distortion, when viewing a horizontal perspective drawing, the use of only one eye and the position and direction of that eye relative to the viewing surface are essential to seeing the open space three dimension horizontal perspective illusion.

Figure 8:
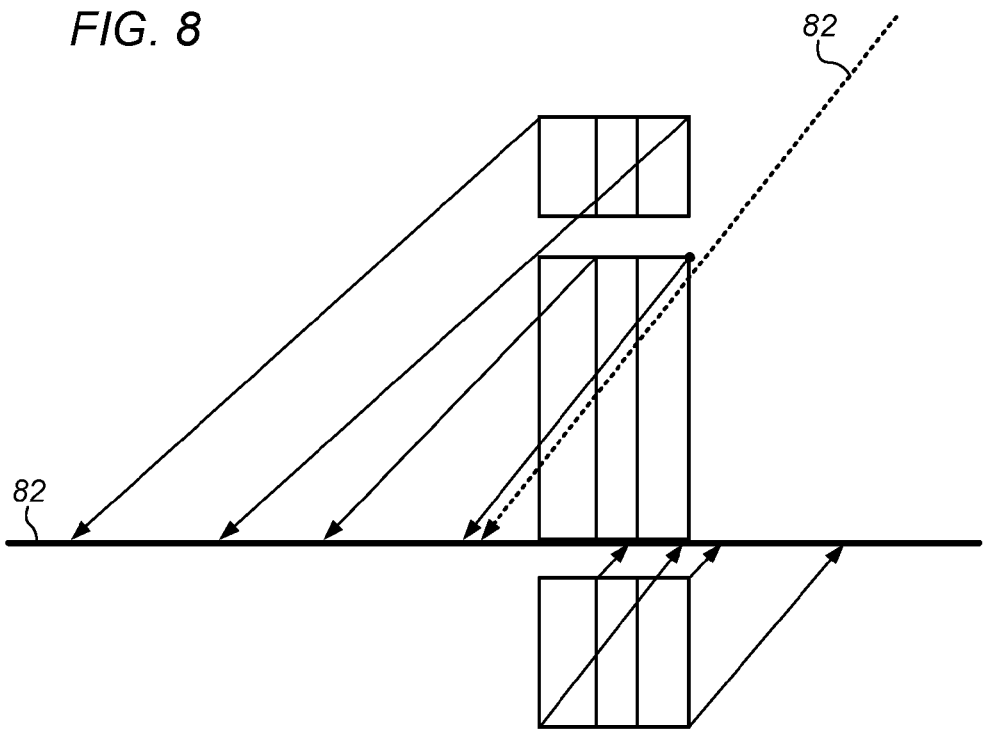
FIG. 8 shows the method of drawing a horizontal perspective drawing.

FIG. 8 is an architectural-style illustration that demonstrates a method for making simple geometric drawings on paper or canvas utilizing horizontal perspective. FIG. 8 is a side view of the same three blocks used in FIG. 7. It illustrates the actual mechanics of horizontal perspective. Each point that makes up the object is drawn by projecting the point onto the horizontal drawing plane. To illustrate this, FIG. 8 shows a few of the coordinates of the blocks being drawn on the horizontal drawing plane through projection lines. These projection lines start at the eye point (not shown in FIG. 8 due to scale), intersect a point on the object, then continue in a straight line to where they intersect the horizontal drawing plane, which is where they are physically drawn as a single dot on the paper. When an architect repeats this process for each and every point on the blocks, as seen from the drawing surface to the eye point along the line-of-sight, the horizontal perspective drawing is complete, and looks like FIG. 7.

Notice that in FIG. 8, one of the three blocks appears below the horizontal drawing plane. With horizontal perspective, points located below the drawing surface are also drawn onto the horizontal drawing plane, as seen from the eye point along the line-of-site. Therefore when the final drawing is viewed, objects not only appear above the horizontal drawing plane, but may also appear below it as well, giving the appearance that they are receding into the paper. If you look again at FIG. 7, you will notice that the bottom box appears to be below, or go into, the paper, while the other two boxes appear above the paper in open space.

The generation of horizontal perspective images requires considerably more expertise to create than central perspective images. Even though both methods seek to provide the viewer the three dimension illusion that resulted from the two dimensional image, central perspective images produce directly the three dimensional landscape from the viewer or camera point. In contrast, the horizontal perspective image appears distorted when viewing head on, but this distortion has to be precisely rendered so that when viewing at a precise location, the horizontal perspective produces a three dimensional illusion.

One of the characteristics of horizontal perspective display is the projection onto the open space, and thus allowing a direct "touching" of the displayed images. Since the images are only projected images, there is no physical manifestation, and thus "touching" is not physically touching, but more like ghost touching, meaning the user can see by eyes and not feel by hands that the images are touched. The horizontal perspective images can also be displayed under the displayed surface, and thus a user cannot "touch" this portion. This portion can only be manipulated indirectly via a computer mouse or a joystick.

To synchronize the displayed images with the reality, the location of the display surface needs to be known to the computer. For a projection display, the projection screen is the display surface, but for a CRT computer monitor, the display surface is typically the phosphor layer, normally protected by a layer of glass. This difference will need to be taken into account to ensure accurate mapping of the images onto the physical world.

One element of horizontal perspective projection is the camera eyepoint, which is the focus of all the projection lines. The camera eyepoint is normally located at an arbitrary distance from the projection plane and the camera's line-of-sight is oriented at a 45° angle looking through the center. The user's eyepoint will need to coincide with the camera eyepoint to ensure minimum distortion and discomfort.

Figure 9:
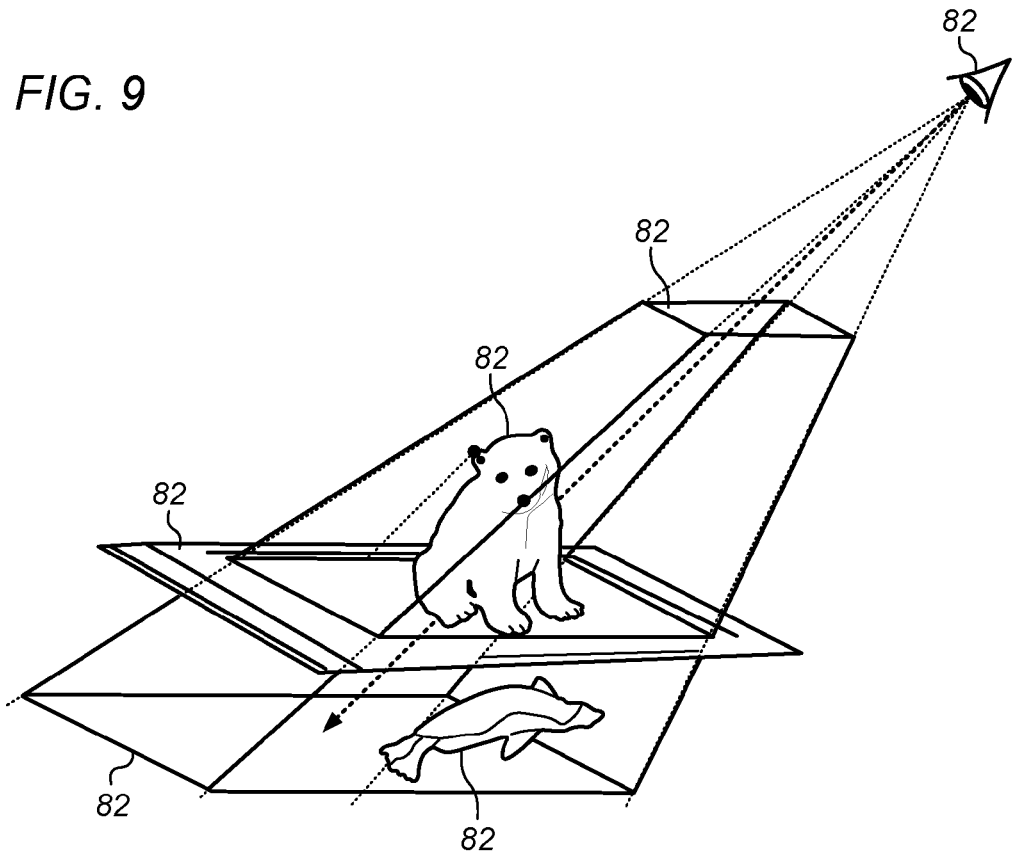
FIG. 9 shows the horizontal perspective mapping of a 3D object onto the projection plane.

Mathematically, the projection lines to the camera eyepoint form a 45° pyramid. FIG. 9 illustrates this pyramid, which begins at the camera eyepoint and extending to the projection plane and beyond. The portion of the pyramid above the projection plane is a hands-on volume, where users can reach their hand in and physically "touch" a simulation. The portion of the pyramid under the projection plane is an inner-access volume, where users cannot directly interact with the simulation via their hand or hand-held tools. But objects in this volume can be interacted with in the traditional sense with a computer mouse, joystick, or other similar computer peripheral.

The horizontal perspective display is preferably placed horizontally to the ground, meaning the projection plane must be at approximately a 45° angle to the end-user's line-of-sight for optimum viewing. Thus the CRT computer monitor is preferably positioned on the floor in a stand, so that the viewing surface is horizontal to the floor. This example uses a CRT-type computer monitor, but it could be any type of viewing device, placed at approximately a 45° angle to the end-user's line-of-sight.

The present invention horizontal perspective hands-on simulator employs the horizontal perspective projection to mathematically project the 3D objects to the hands-on and inner-access volumes.

The system preferably displays stereoscopic images through stereoscopic 3D computer hardware to provide the user with multiple or separate left- and right-eye views of the same simulation. Thus, stereoscopic 3D hardware devices utilize methods with glasses such as anaglyph method, special polarized glasses or shutter glasses, methods without using glasses such as a parallax stereogram, a lenticular method, and mirror method (concave and convex lens).

In the anaglyph method, a display image for the right eye and a display image for the left eye are respectively superimpose-displayed in two colors, e.g., red and blue, and observation images for the right and left eyes are separated using color filters, thus allowing a viewer to recognize a stereoscopic image. In polarized glasses method, the left eye image and the right eye image are separated by the use of mutually extinguishing polarizing filters such as orthogonally linear polarizer, circular polarizer, and elliptical polarizer. Another way for stereoscopic display is the image sequential system. In such a system, the images are displayed sequentially between left eye and right eye images rather than superimposing them upon one another, and the viewer's lenses are synchronized with the screen display to allow the left eye to see only when the left image is displayed, and the right eye to see only when the right image is displayed. The shuttering of the glasses can be achieved by mechanical shuttering or with liquid crystal electronic shuttering. Other way to display stereoscopic images is by optical method. In this method, display images for the right and left eyes, which are separately displayed on a viewer using optical means such as prisms, mirror, lens, and the like, are superimpose-displayed as observation images in front of an observer, thus allowing the observer to recognize a stereoscopic image. Large convex or concave lenses can also be used where two image projectors, projecting left eye and right eye images, are providing focus to the viewer's left and right eye respectively. A variation of the optical method is the lenticular method where the images form on cylindrical lens elements or a two dimensional array of lens elements.

Figure 10:
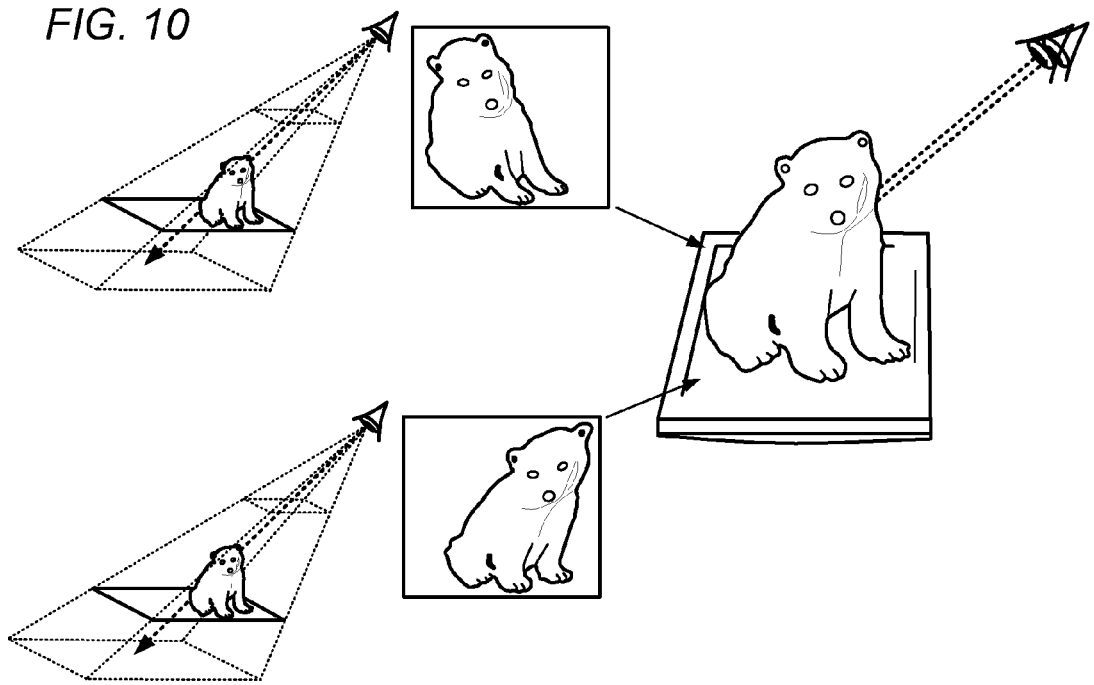
FIG. 10 shows the two-eye view.

FIG. 10 illustrates the stereoscopic displayed images of the present horizontal perspective simulator. The user sees the bear cub from two separate vantage points, i.e. from both a right-eye view and a left-eye view. These two separate views are slightly different and offset because the average person's eyes are about 2 inches apart. Therefore, each eye sees the world from a separate point in space and the brain puts them together to make a whole image.

To provide motion, or time-related simulation, the displayed images are updated frequently. This is similar to a movie projector where the individual displayed images provide the illusion of motion when the updating frequency is higher than about 24 Hz. Adding to the stereoscopic view, the simulator would need to double this frequency to update both the left and the right eye views.

The horizontal perspective display system promotes horizontal perspective projection viewing by providing the viewer with the means to adjust the displayed images to maximize the illusion viewing experience. By employing the computation power of the microprocessor and a real time display, the horizontal perspective display is capable of re-drawing the projected image to match the user's eyepoint with the camera eyepoint to ensure the minimum distortion in rendering the three dimension illusion from the horizontal perspective method. The system can further comprise an image enlargement/reduction input device, or an image rotation input device, or an image movement device to allow the viewer to adjust the view of the projection images. The input device can be operated manually or automatically.

The present invention simulator further includes various computer peripherals. Typical peripherals are space globe, space tracker, and character animation devices, which are having six degrees of freedom, meaning that their coordinate system enables them to interact at any given point in an (x, y, z) space.

With the peripherals linking to the simulator, the user can interact with the display model. The simulator can get the inputs from the user through the peripherals and manipulate the desired action. With the peripherals properly matched with the physical space and the display space, the simulator can provide proper interaction and display. The peripheral tracking can be done through camera triangulation or through infrared tracking devices. Triangulation is a process employing trigonometry, sensors, and frequencies to "receive" data from simulations in order to determine their precise location in space.

The simulator can further include 3D audio devices. 3D audio also uses triangulation to send or project data in the form of sound to a specific location. By changing the amplitudes and phase angles of the sound waves reaching the user's left and right ears, the device can effectively emulate the position of the sound source. The sounds reaching the ears will need to be isolated to avoid interference. The isolation can be accomplished by the use of earphones or the like.

Figure 11:
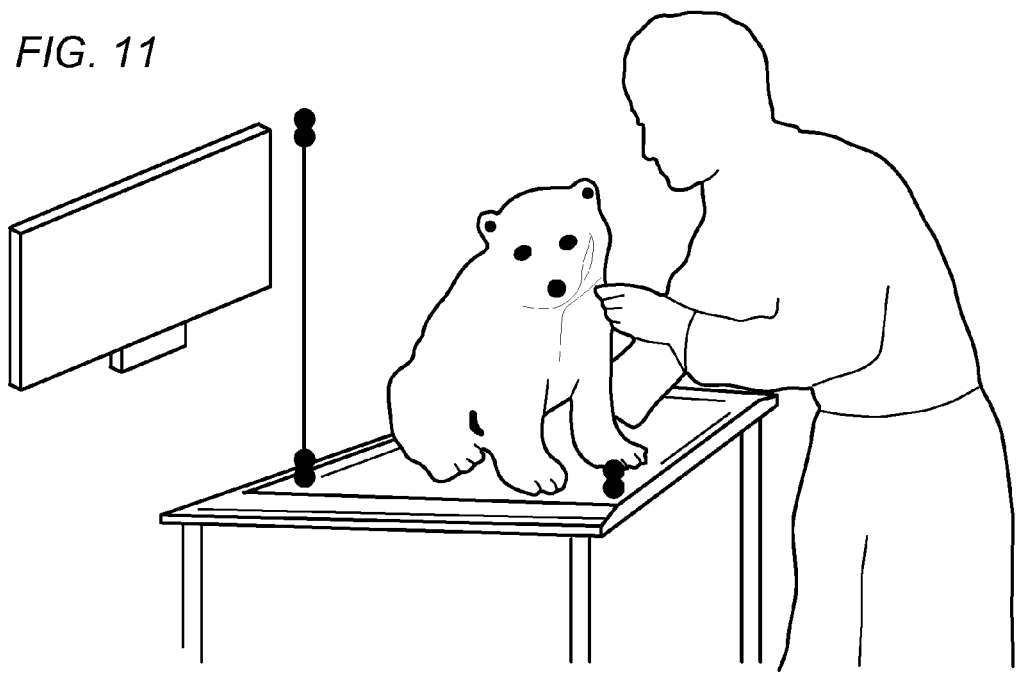
FIG. 11 shows another embodiment of the horizontal perspective workstation.

FIG. 11 shows a user looking at an image of a bear cub. Since the cub appears in open space above the viewing surface, the user can reach in and manipulate the cub by hand or with a handheld tool. It is also possible for the user to view the cub from different angles, as they would in real life. This is accomplished though the use of triangulation where the three cameras continuously send images to the computer. This camera data enables the computer to locate, track, and map the user's body and other simulations positioned within and around the computer monitor's viewing surface. The simulator then performs simulation recognition by continuously locating and tracking the user's "left and right eye" and their "line-of-sight". This enables the real-time generation of simulations based on the exact location of the end-user's left and right eye, which then allows the user to freely move his head and look around the displayed image without distortion.

This figure also includes 3D sounds emanating from the cub's mouth. This level of audio quality requires physically combining each of the three cameras with a separate speaker. The cameras' data enables the computer to use triangulation in order to locate, track, and map the user's left and right ear. Since the computer is generating the bear cub as a computer-generated image, it knows the exact location of the cub's mouth. By knowing the exact location of the user's ears and the cub's mouth, the computer uses triangulation to send data, by modifying the spatial characteristics of the audio, making it appear that 3D sound is emanating from the cub's computer-generated mouth. The simulator then performs simulation recognition by continuously locating and tracking the end-user's "left and right ear" and their "line-of-hearing". This enables the real-time generation of sounds based on the exact location of the user's left and right ears, which then allows the user to freely move his head and still hear 3D sounds emanating from his correct location.

The simulator then performs simulation recognition by continuously locating and tracking the end-user's "left and right hand" and their "digits," i.e. fingers and thumbs. This enables the real-time generation of simulations based on the exact location of the end-user's left and right hands, allowing the user to freely interact with the displayed simulations. The simulator then performs simulation recognition by continuously locating and tracking "handheld tools". This enables the real-time generation of simulations based on the exact location of the handheld tools.

The present invention further includes more than one display comprising a horizontal perspective display together with a non-horizontal display. The multiple display system can also include a curvilinear connection display section to blend the horizontal perspective image and the other image together.

The three dimensional simulator would not be complete without a three dimensional audio or binaural simulation. Binaural simulation offers realism to the three dimensional simulation together with 3D visualization.

Similar to vision, hearing using one ear is called mono-aural and hearing using two ears is called binaural. Hearing can provide the direction of the sound sources but with poorer resolution than vision, the identity and content of a sound source such as speech or music, and the nature of the environment via echoes, reverberation such as a normal room or an open field. Although we can hear with one ear, hearing with two ears is clearly better. Many of the sound cues are related to the binaural perception depending on both the relative loudness of sound and the relative time of arrival of sound at each ear. And thus, the binaural performance is clearly superior for the localization of single or multiple sound sources; for the formation of the room environment; for the separation of signals coming from multiple incoherent and coherent sound sources; and the enhancement of a chosen signal in a reverberant environment.

A 3D audio system should provide the ability for the listener to define a three-dimensional space, to position multiple sound sources and that listener in that 3D space, and to do it all in real-time, or interactively. Beside the 3D audio system, other technologies such as stereo extension and surround sound could offer some aspects of 3D positioning or interactivity. For a better 3D audio system, audio technology needs to create a life-like listening experience by replicating the 3D audio cues that the ears hear in the real world for allowing non-interactive and interactive listening and positioning of sounds anywhere in the three-dimensional space surrounding a listener.

The head tracker function is also very important to provide perceptual room constancy to the listener. In other words, when the listener moves his head around, the signals would change so that the perceived auditory world maintain its spatial position. To this end, the simulation system needs to know the head position in order to be able to control the binaural impulse responses adequately. Head position sensors are therefore provided. The impression of being immersed is of particular relevance for applications in the context of virtual reality.

The eyes and ears often perceive an event at the same time. Seeing a door close and hearing a shutting sound are interpreted as one event if they happen synchronously. If we see a door shut without a sound, or we see a door shut in front of us and hear a shutting sound to the left, we get alarmed and confused. In another scenario, we might hear a voice in front of us and see a hallway with a corner; the combination of audio and visual cues allows us to figure out that a person might be standing around the corner. Together, synchronized 3D audio and 3D visual cues provide a very strong immersion experience. Both 3D audio and 3D graphics systems can be greatly enhanced by such synchronization.

The horizontal perspective workstation can also comprise various biofeedback devices for user's inputs and outputs. A typical biofeedback device is a brain wave electrode measurement, such as an electroencephalographic (EEG) system. The brain wave biofeedback system can be used to balance the left and the right side of the brain using binaural beat. The biofeedback device typically comprises an EEG system to measure the brain left and right electrical signals to determine the brain wave imbalance and an audio generator to generate a binaural beat to compensate for the unbalanced EEG frequencies.

Other biofeedback devices are skin conductance or galvanic skin response to measure the electrical conductance of the external skin, temperature measurement of the body, hand and foot, heart rate monitoring, and muscle tension measurement.

Figure 12:
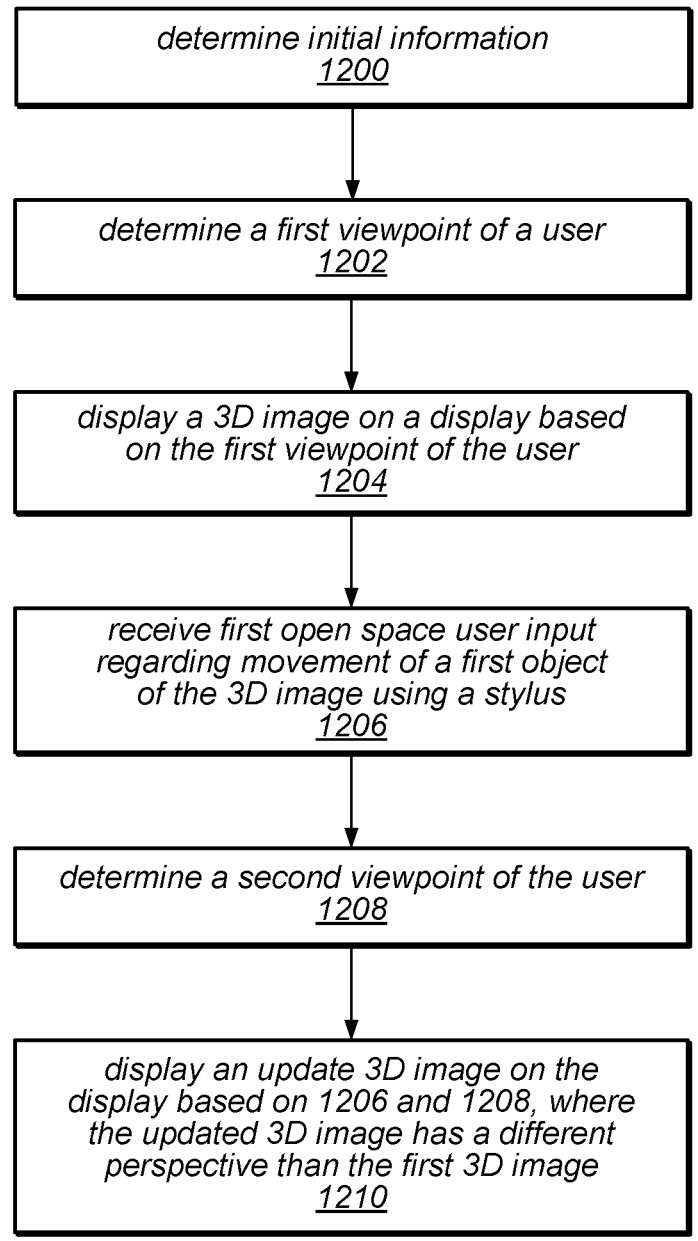
FIG. 12 is a flowchart illustrating one embodiment of a method for updating perspective of 3D images based on changes in viewpoint of a user.

FIG. 12—Updating Perspective Based on User Viewpoint

As indicated above, it may be desirable to provide different perspectives depending upon a user's viewpoint with respect to a display. For example, it may be desirable to provide a central or vertical perspective when a user's viewpoint results in a line of sight (also referred as "viewing angle", e.g., relative to a display) that is approximately perpendicular to a display. Similarly, it may be desirable to provide a horizontal or oblique perspective when a user's viewing angle is oblique to the display (e.g., approximately 45 degrees). As described herein, 3D images may be provided (e.g., via stereoscopic images) and updated based on the change in perspective as the user's viewpoint changes.

Accordingly, FIG. 12 is a flowchart illustrating one embodiment of a method for updating the perspective of 3D images based on changes in viewpoint of a user. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1200, display information may be received or determined. The display information may describe a variety of relationships that may be necessary for rendering stereoscopic images correlating to a proper perspective to a user. For example, the display information may indicate a position of one or more displays that may be used for providing the stereoscopic images. The position information of each display may be relative information. For example, the position information may be relative to viewpoint position information (as determined below) or other position information (e.g., of various sensors, cameras, stylus, etc.), as desired. Thus, the display information may indicate the position of the display in one fashion or another.

The display information may also indicate dimensions of the display(s). For example, the dimensions of the display(s) may indicate a length, width, and/or depth of each display. The dimensions of the display(s) may also indicate various depth or display information of the display. For example, the dimensions may indicate the depth of the display surface (e.g., the glass or other material that covers the display). This depth information may be important for properly rendering stereoscopic images using the display. For example, without this display surface information, the method may not be able to accurately provide stereoscopic images of objects that are able to be "touched" (via open space input) when they are near the display surface. For example, if the display surface is sufficiently deep, and the display surface information is not known or adjusted for, the user may not be able to use a stylus to interact with objects that are near the display surface (e.g., since the method is unaware of the depth of the display surface, objects may be just underneath, and therefore unreachable by the stylus). As a further example, if the rendered object is slightly beyond the render surface (e.g. the LCD layer) and the glass extends beyond the render layer ½ inch, then the stereo image may convey the object beyond the render layer, but not beyond the glass layer, so the user cannot place the stylus at a position that may correlate to the perceived location of the rendered object.

The display information may be determined or received via a variety of methods. For example, the display information may be provided by a user, determined during a calibration routine, determined using one or more position sensors (e.g., that are attached to the display), determined using cameras, etc. Further details regarding the determination of display information can be found in U.S. Provisional Patent Application No. 61/426,451, which was filed on Dec. 22, 2010, whose inventors were Michael A. Veseley, Peter F. Ulmann, and Jerry Tu, which is hereby incorporated by reference in its entirety as if fully and completely set forth herein.

As indicated above, the method may utilize more than one display. For example, the method may use a horizontal display, a vertical display, and/or a curvilinear display (e.g., blending images of the vertical and horizontal displays). Accordingly, the display information may be determined for each of the displays.

In 1202, a first viewpoint of the user may be determined. The first viewpoint may be determined according to a variety of methods, such as those described above. For example, the first viewpoint of the user may be determined by determining a position of the user's left eye and/or determining a position of the user's right eye, as desired.

In 1204, a 3D image may be provided for display on at least one display based on the display information and the first viewpoint of the user. More specifically, for a first display, a first stereoscopic image of the 3D image may be displayed according to a first perspective that is based on the first viewpoint of the user relative to the position of the first display. Please note that while 1204 is characterized as providing a 3D image, it is to be understood that the image is only referred to as 3D since the user perceives it as such (via the stereoscopic methods described above). Thus, the 3D image may be provided by providing stereoscopic images (e.g., a stereoscopic pair of images from each display) that the user then perceives as a 3D image.

In one embodiment, in order to provide the stereoscopic image with the proper perspective, the user's viewpoint position and angle relative to the display may be determined. For example, the method may determine the angle formed between the plane of the display surface and the line of sight of the user. Accordingly, instead of assuming a certain angle for each display (e.g., 90 degrees for a vertical display and 45 degrees for a horizontal display), the method may actually determine the angle by using the viewpoint location and the display location described above. Thus, where the viewing angle relative to the display is 43 degrees, a perspective corresponding to 43 degrees may be used rather than assuming an angle of 45 degrees. Thus, the determination of the viewpoint not only determines what angle of the scene the user sees in a 3D image (which is the typical purpose of head tracking), but also how the user sees it (i.e., the perspective of the 3D image corresponds to the user's changing viewpoint). The particular method by which the 3D image is rendered in order to achieve this effect are varied; however, further details regarding embodiments of a method for performing this adjustment are provided below. Additionally, while the above descriptions refer to angles in only two dimensions, it should be understood that the viewpoint location angle may also be determined and adjusted for in the third dimension (e.g., not just z and y, but also z and x, as well as pitch, yaw and roll among other possibilities).

Note that the determination of the perspective and provision of the stereoscopic image may be performed for each display used to provide the 3D image. Thus, when using a vertical display and a horizontal display, the correct perspective may be determined for each display (e.g., since the angle of the user's viewpoint relative to the display will be different for each, owing to their different positions/angles). Thus, the 3D image may be provided for display using one or more displays and may provide a perspective (for each display) that corresponds to the user's viewpoint. For example, a first perspective may be determined for a vertical display based on a viewing angle of 2 degrees for the first display and a second perspective may be determined for a horizontal display based on a viewing angle of 47 degrees all using the same viewpoint position.

In 1206, open space user input (e.g. using a stylus) may be received regarding movement of a first object conveyed in the 3D image. In one embodiment, in order to receive the open space user input, location information of the stylus may be received. For example, the location of the stylus may be determined and/or received using camera triangulation, among other methods. For example, a user may use the stylus to select, move, or otherwise interact with an object displayed in the 3D image. By determining the position of the stylus and by knowing the position of the object displayed in the 3D image (e.g., relative to the display's position by using the display information received in 1202), precise stylus interaction may be achieved. Alternatively, instead of knowing the position of the graphic object of the 3D image in physical space, the position information of the stylus may be used to determine its position within virtual space. Accordingly, the position of the stylus and the objects of the 3D images may be in the same space, thereby allowing the user to interact with graphic objects of the 3D image as if they were physical objects. This object may be particularly achieved by utilizing a one to one correspondence between the real world position information and the virtual position information.

Thus, the stylus may be used to interact with graphic objects that are displayed outside of the display(s) and is thus "open space user input". However, it should be understood that other interactions are envisioned besides open space user input, e.g., where the user interacts with inner space objects, e.g., using a mouse or other user input device, as desired. Further, a stylus may not be required. For example, the user may be able to interact with the graphic objects using a hand, finger, glove, or any object, as desired. Thus, while embodiments described herein refer to a "stylus" or information regarding a stylus, they may be modified to be any object, including body parts.

In 1208, a second viewpoint of the user may be determined, e.g., after receiving the first open space user input in 1206. The second viewpoint is different than the first viewpoint. Thus, the second viewpoint may be determined after the user has changed his viewpoint location (e.g., from a first location to a second location) and may be performed similarly to 1202 above.

Accordingly, in 1210, an updated 3D image may be displayed on the one or more displays (similar to 1204 above) based on the change in viewpoint in 1208 and/or the open space user input in 1206. More specifically, because the viewpoint changed in 1208, the stereoscopic image from each display may have a second perspective that is different than the first perspective of the stereoscopic image displayed in 1204. For example, in one embodiment, the first perspective may be a horizontal or oblique perspective, and the second perspective may be a central or vertical perspective. However, the perspectives may be both oblique perspectives. In one embodiment, the first perspective may be a horizontal perspective corresponding to a viewpoint where the user's viewing angle is 45 degrees relative to the display and the second perspective may be a horizontal perspective corresponding to a viewpoint where the user's viewing angle is 42 degree angle relative to the display. Similar to above, where there are more than one displays, the change in perspective may be determined for each display. Thus, as the user's viewpoint changes, the rendered perspective of the stereoscopic images provided from each display changes based on the new viewpoint and the position, orientation, and/or dimensions of the display.

Note that while 1210 is indicated as occurring after 1206 and based on the open space user input, the method may be performed without receiving the input in 1206. For example, the stereoscopic images may be updated based only on changes of the user's viewpoint without requiring interaction via the stylus. Additionally, it should also be noted that while 1210 is described as being based on the user's viewpoint changes or use of the stylus, it may also be based on other factors. For example, the 3D image may be a moving 3D image (or include moving objects) or may be updated based on other software factors (e.g., notifications, interactions from remote users, etc.). Accordingly, the 3D image may be updated based on changes to the 3D scene in addition to the changes of the viewpoint and/or use of the stylus. However, regardless of the underlying 3D image, the stereoscopic images provided for display may have a perspective that is based on the user's viewpoint, as described above.

The method described above may be repeatedly performed while providing 3D images via the one or more displays. For example, the method may repeatedly perform 1206-1210 as the user uses a stylus and changes his viewpoint. In further embodiments, the display information in 1200 (e.g., particularly the display position information) may be updated one or more times while the method is performed. By periodically determining or receiving this display information, the method may allow the display itself to be moved while providing 3D images while still updating the 3D images to have the correct perspective. For example, if the user moves the display to have a new angle with respect to the user's viewpoint (e.g., for each of viewing), then the method may update the perspective of the stereoscopic images for that display based on the new relationship between the user's viewpoint and the position of the display. Thus, the method may continually update the perspective of stereoscopic images of a 3D image based on changes in the 3D image, e.g., due to stylus interaction, underlying changes in the graphics scene, etc., changes in the user's viewpoint, and/or changes in the position or orientation of the display(s).

FIGS. 13A-18B

FIGS. 13A-18B provide various comparisons of the method described above with regard to the prior art in order to provide explicate the benefits of the method.

Figure 13A:
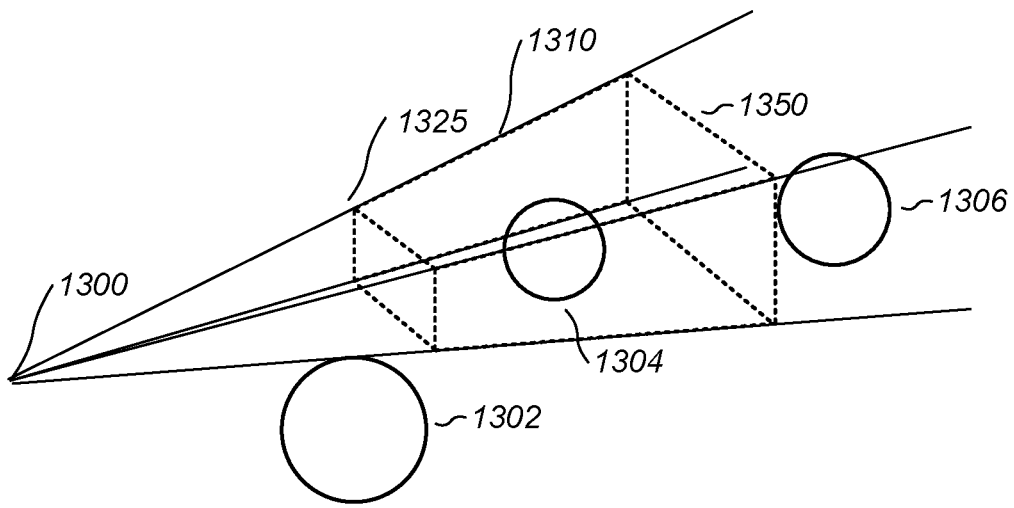
FIGS. 13A-18B illustrates various benefits of the method of FIG. 12.
Figure 13B:
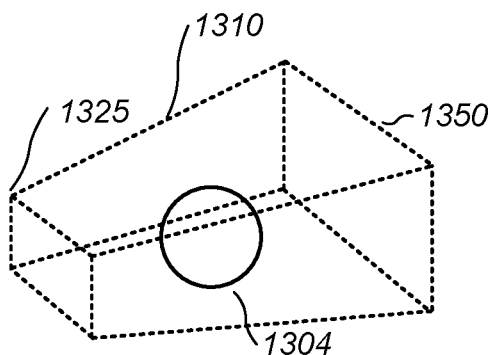
Figure 13C:
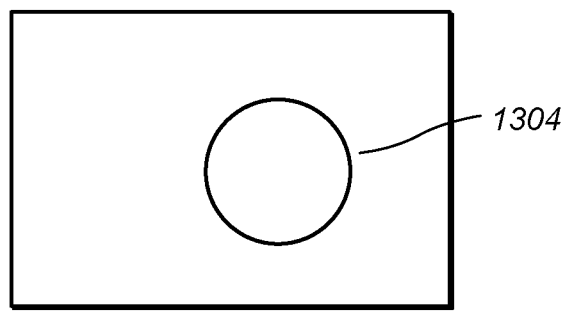

More specifically, FIGS. 13A-13C illustrate a typical central perspective rendering. FIG. 13A provides an exemplary viewpoint 1300 within a virtual space including graphic objects 1302, 1304, and 1306. As shown in FIG. 13B, only object 1304 falls within the frustum 1310 of viewpoint 1300 as defined by near clipping plane 1325 and far clipping plane 1350. FIG. 13C illustrates the corresponding image provided for display when using the near clipping plane 1325 as the rendering plane, as is typically the case.

Figure 14:
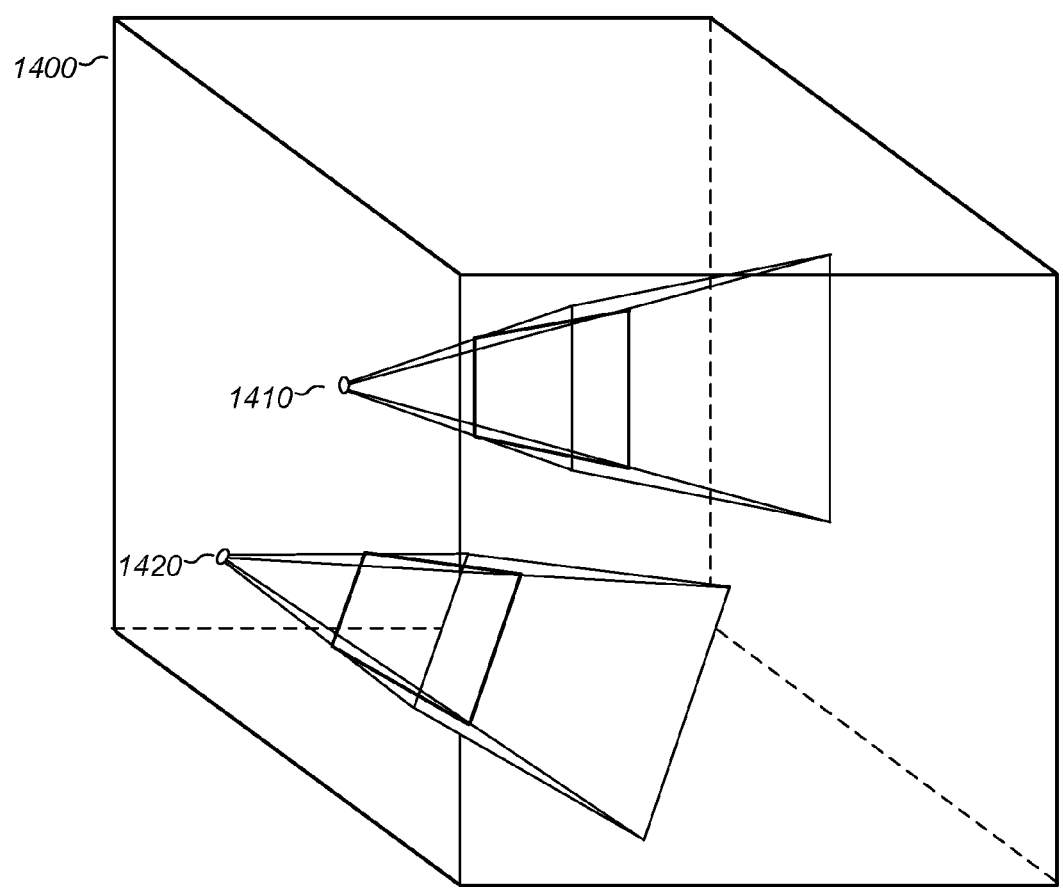

FIG. 14 illustrates a change in viewpoint and the corresponding change in frustum within a virtual space 1400 for typical systems. As shown, as the viewpoint changes from directly across in 1410 to back and down in 1420, the frustum includes different areas of the virtual space 1400. However, the perspective of the two viewpoints remains exactly the same.

Figure 15A:
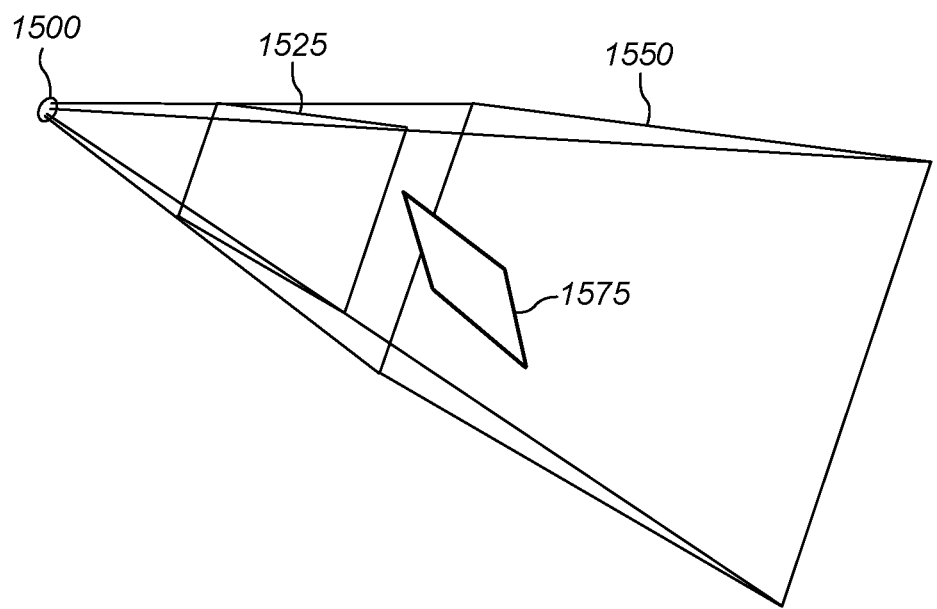
Figure 15B:
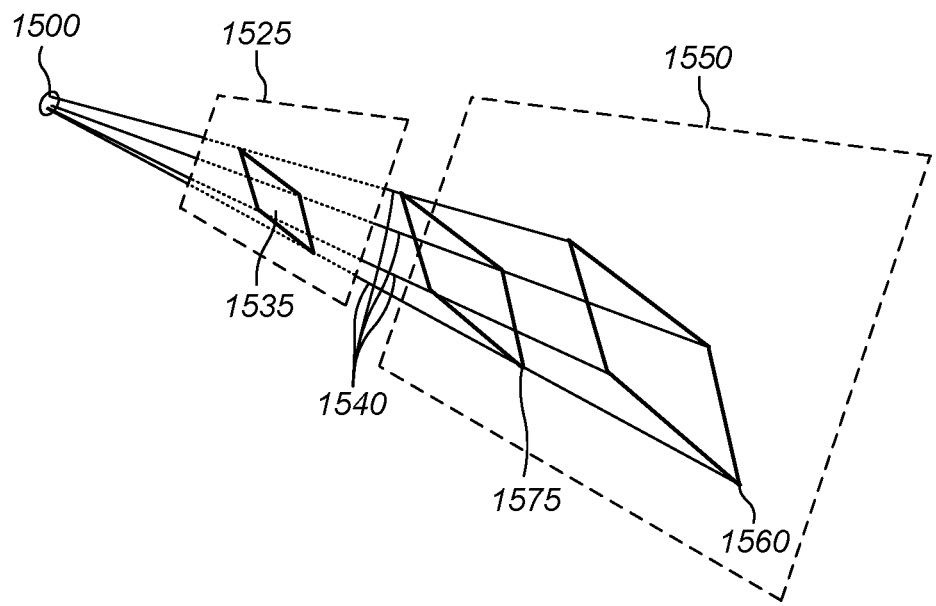

FIGS. 15A and 15B illustrate an alternative way to define frustums and render surfaces in a virtual space. As shown in FIG. 15A, a new render surface 1575 is included within the frustum. In this embodiment, the render surface is distinct from the near clipping plane and the plane of the near clipping plane may not be parallel to the plane of the render surface. In one embodiment, the render surface 1575 may be a virtual object (which may not be rendered or displayed in the 3D image) that corresponds to the physical display used as the plane of projection of the graphic objects for rendering images of the virtual space. Additionally, the relationship between the viewpoint 1500 position and the render surface 1575 position may be the same as the relationship of the user's physical viewpoint position (i.e., his eyepoint) and the physical position, dimension and orientation of the display providing stereoscopic images. Thus, the render surface and the physical display may be similarly positioned in virtual space and physical space relative to virtual viewpoint and the user's physical viewpoint. Accordingly, as shown in FIG. 15B, the frustum boundaries 1540 may be redefined with respect to the edges of the render surface 1575, which correspond to the edges and dimensions of the display with an adjusted near clipping plane 1535 and an adjusted far clipping plane 1560, where the modified near and far clipping planes are of a dimension that reflects the sizing, position and orientation of the display device. More specifically, as shown, the modified near and far clipping planes may be defined by intersecting the plane of the near and far clipping planes with the ray traces extending from the viewpoint to the boundaries of the render surface. By defining the frustum in this new way, as described in more detail below, the user's viewing angle and orientation of the display can be used to provide stereoscopic images that have the correct perspective given the user's current physical viewpoint and the position/orientation of the display. Thus, this new relationship allows the stereoscopic images to have the correct perspective as the user's viewpoint changes, as described above.

Figure 16A:
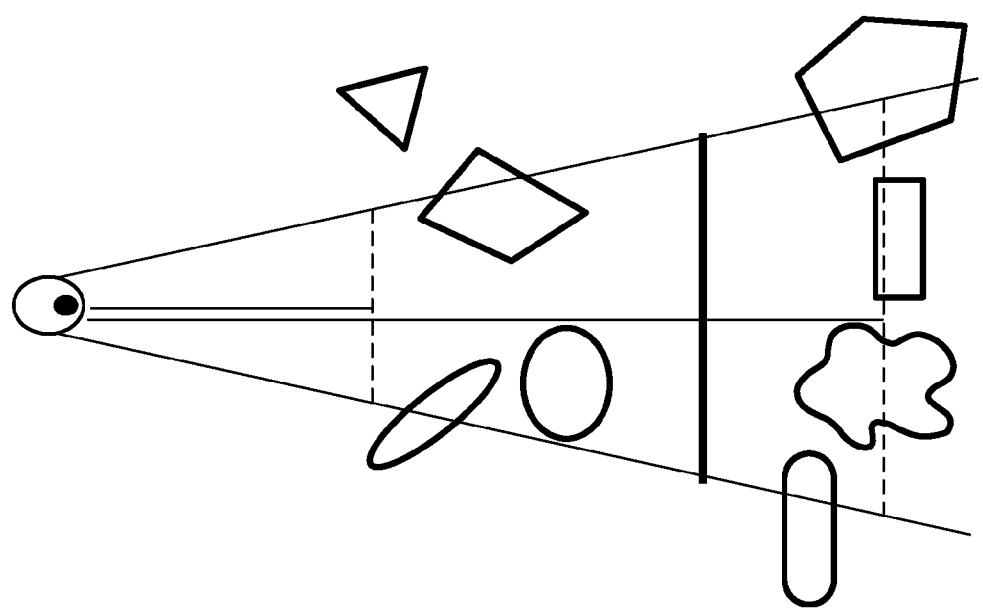
Figure 16B:
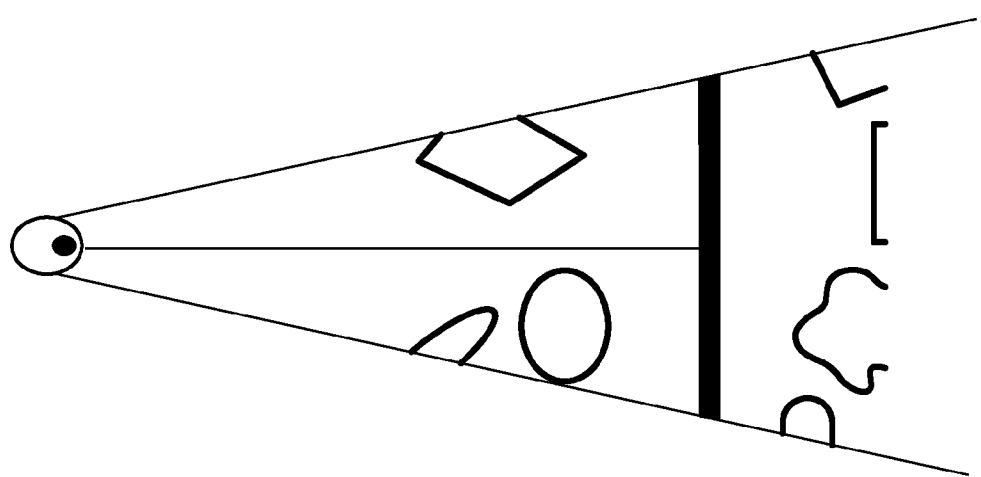
Figure 17A:
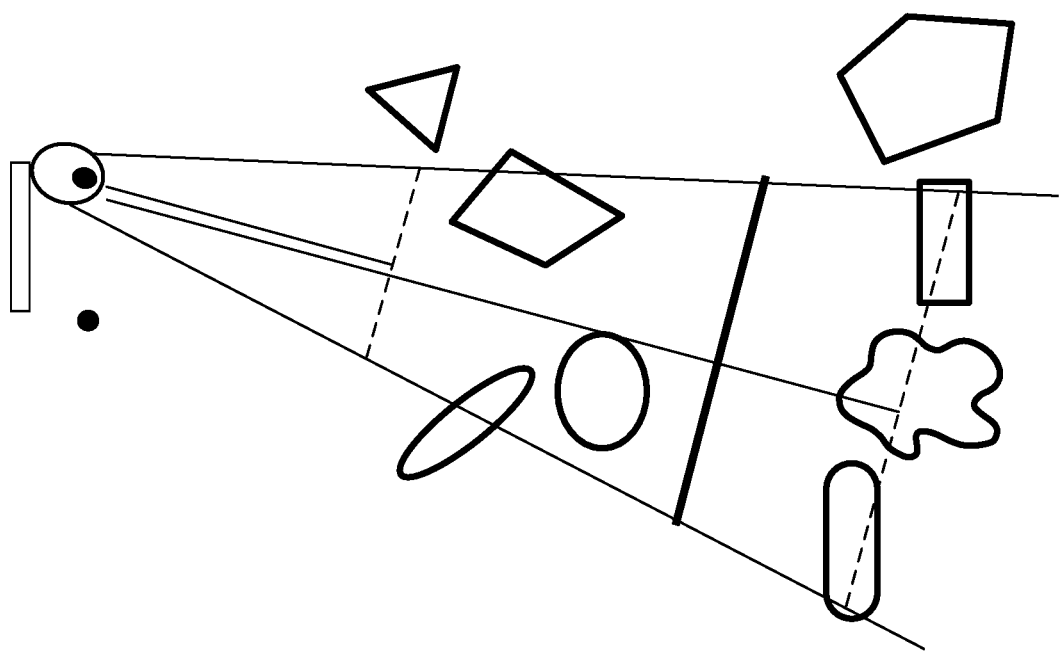
Figure 17B:
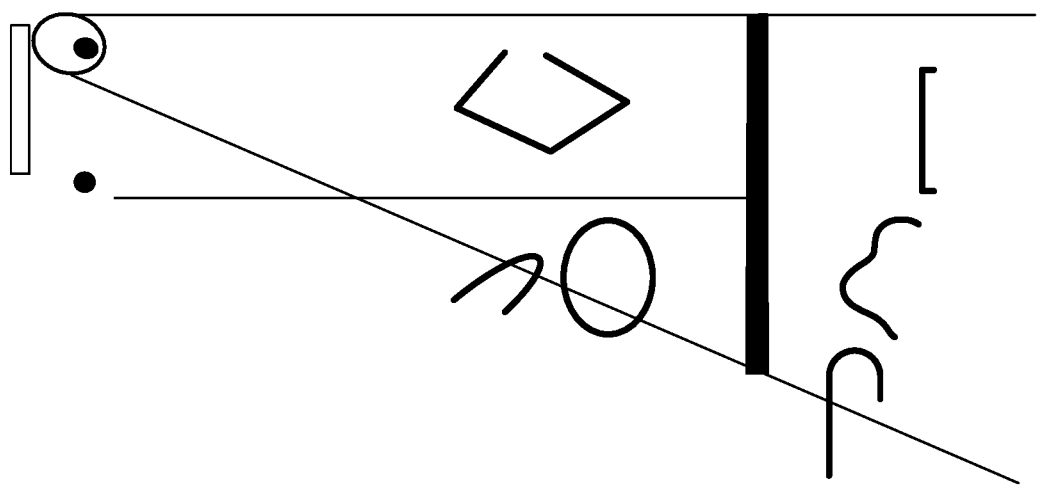
Figure 18A:
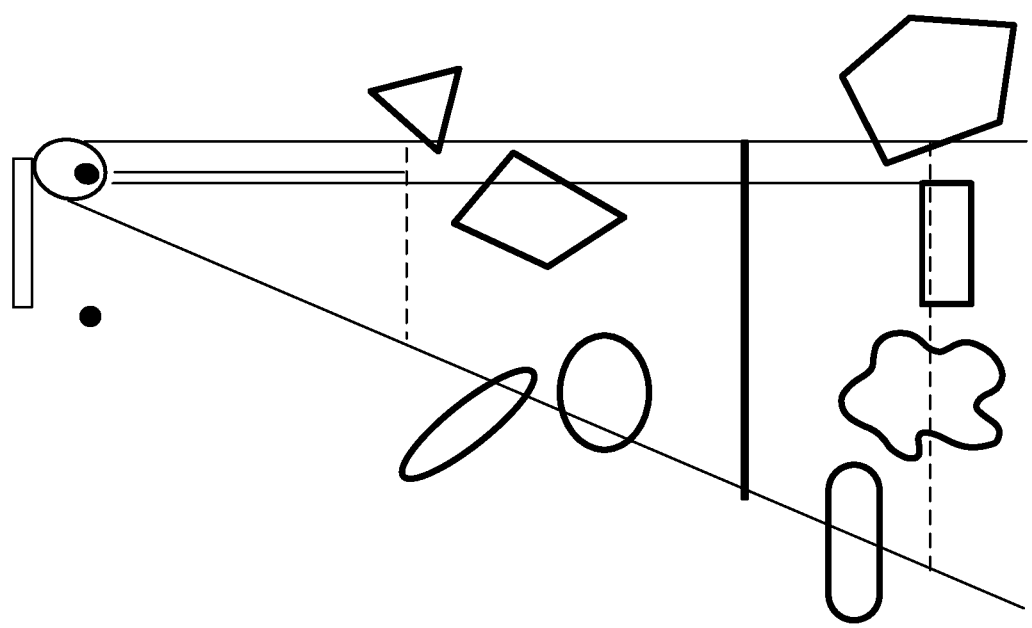
Figure 18B:
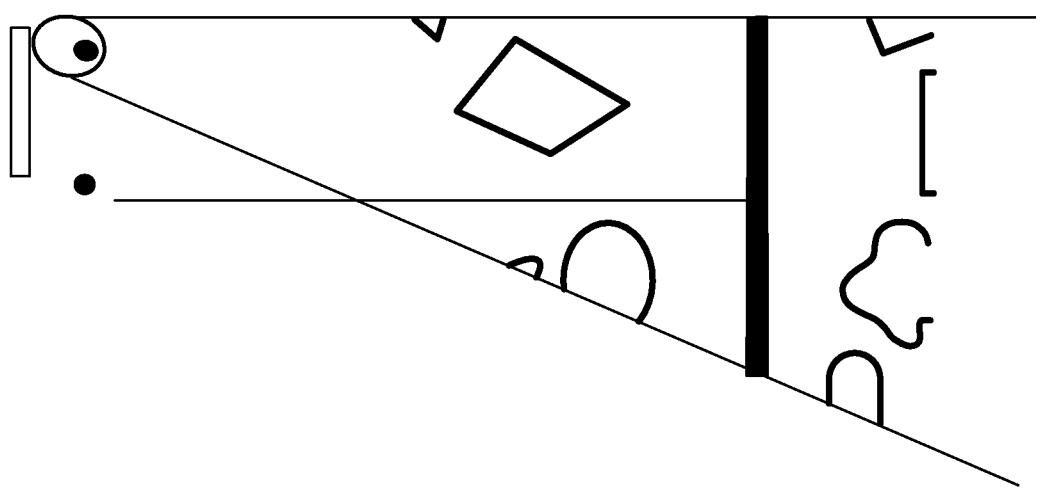

FIGS. 16A and 16B illustrate rendering from a virtual space in two dimensions. The viewpoint in the virtual space of FIG. 16A only views objects within the defined frustum, as shown in FIG. 16B. FIGS. 17A and 17B illustrate the typical reaction to a change in viewpoint in the prior art, similar to the change in viewpoint in FIG. 14. As shown in 17A, as the user changes his viewpoint vertically up, the same frustum and perspective from 16A is used to determine the viewed objects. Correspondingly, FIG. 17B illustrates the rendered objects with the resulting issues. As shown in FIG. 17B, since the display in 17B has not changed its angle to match the angle of the rendering plane in FIG. 17A (or said another way, since the user's viewing angle relative to the rendering plane was not changed in 17A to match the physical reality of FIG. 17B), the resulting image is skewed and does not show the proper portions of the objects in the correct perspective. However, using the methods described above, in FIGS. 18A and 18B, a new perspective that takes into account the new viewing angle of the user is used to render the stereoscopic image. More specifically, in FIG. 18A, the objects are rendered according to a different perspective than was provided in 16A since the user's viewing angle has changed from 90 degrees to one that is different (e.g., 80 degrees). Accordingly, the virtual objects are rendered for display in the proper perspective in FIG. 18B, following methods described above, as opposed to that of FIG. 17B.

Similar to above, while these Figures only show the viewing angle in two dimensions, it is to be understood that the viewing angle may be determined and adjusted for in three dimensions, thus accounting for both the viewing angle in the x and z plane and the viewing angle in the y and z plane. Further, while descriptions above relate to a single frustum, the method may generally use the methods to render a left and right stereoscopic image pair using a frustum for each eye. Thus, the methods may be used for each eye in order to generate a stereoscopic image.

Figure 19:
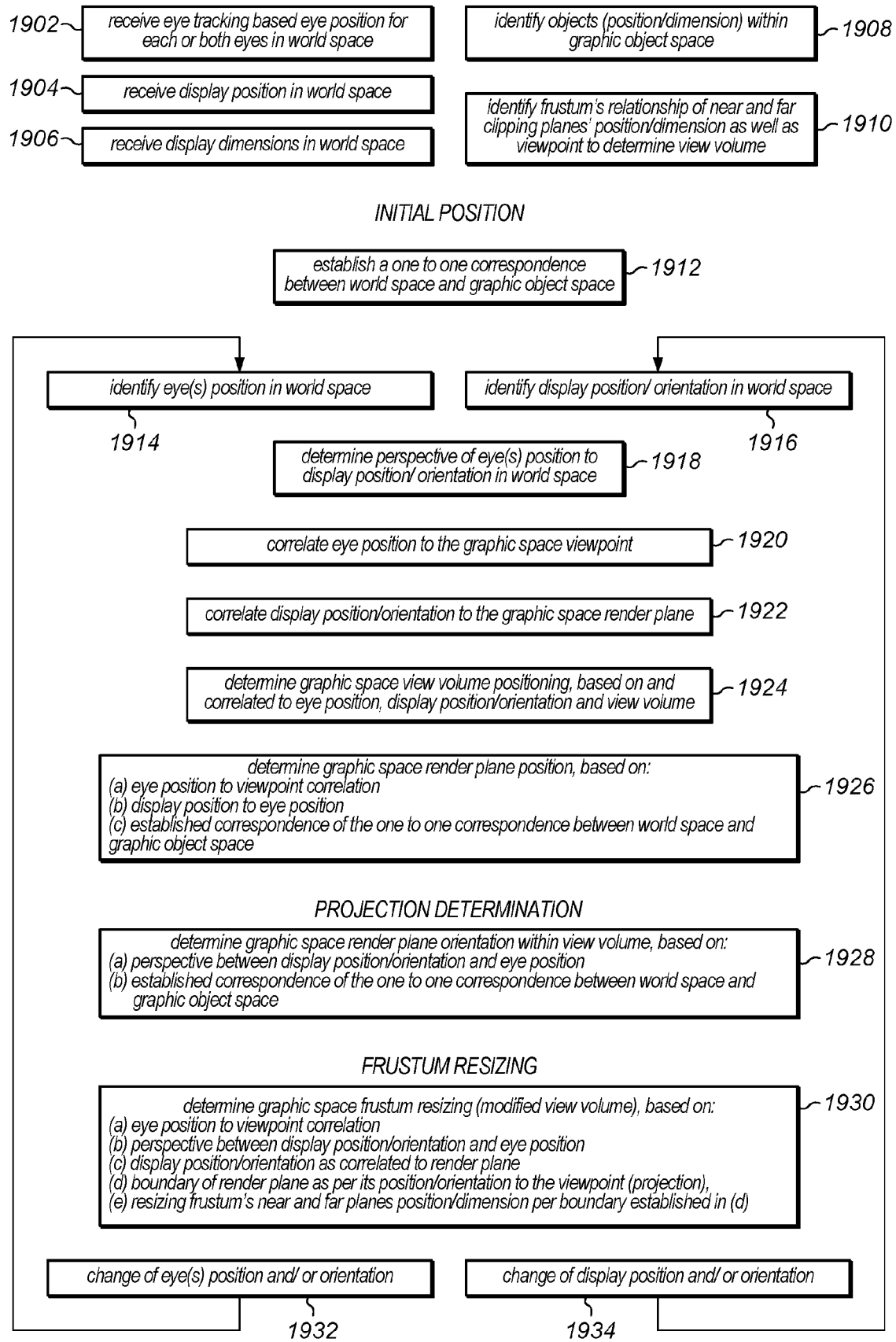
FIGS. 19 and 20 are flowcharts illustrating specific embodiments of the method of FIG. 12.
Figure 20:
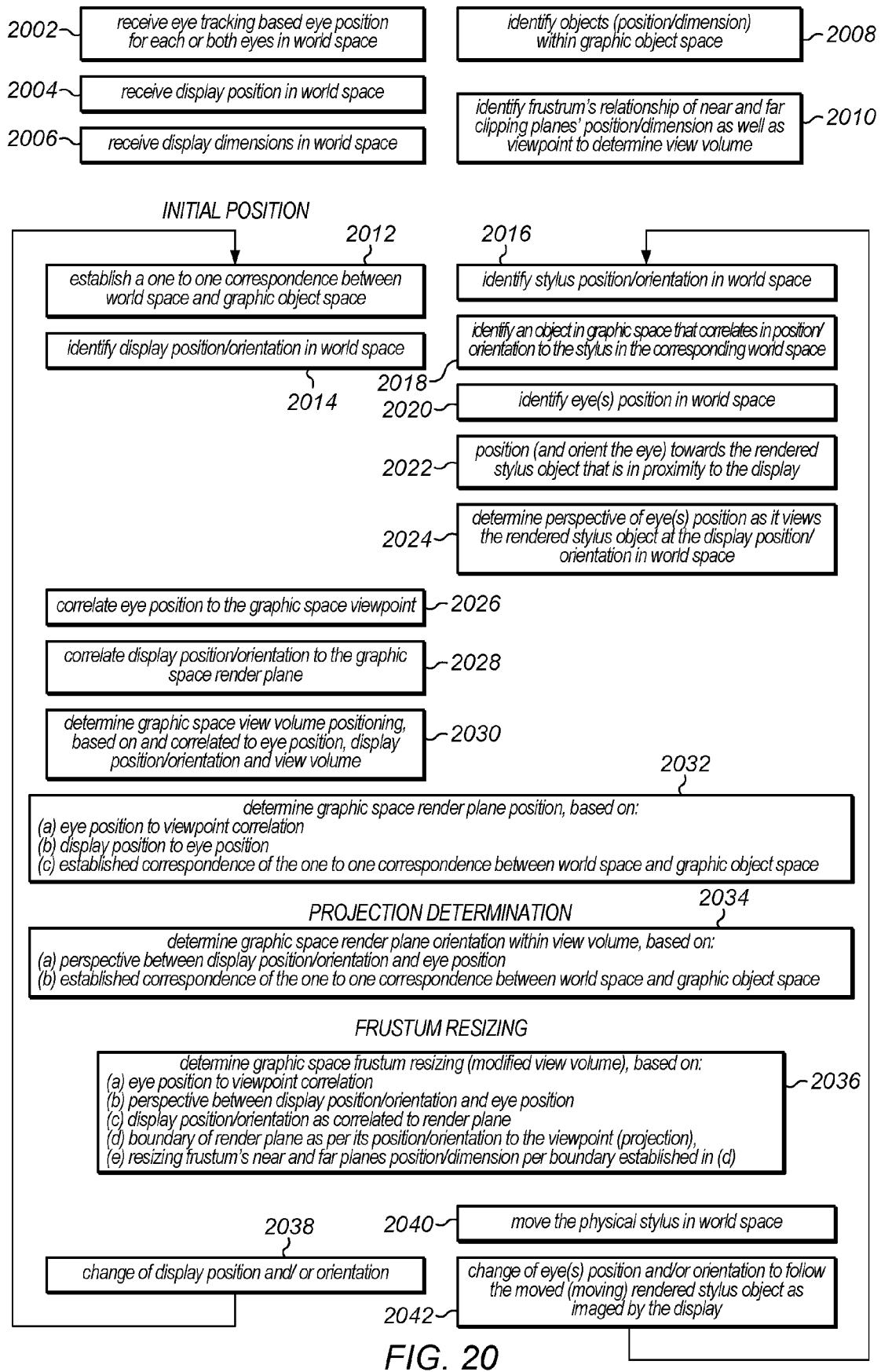

FIGS. 19 and 20—Specific Embodiments

FIGS. 19 and 20 are flowcharts illustrating specific embodiments of the method of FIG. 12. The method shown in FIGS. 19 and 20 may be used in conjunction with any of the computer systems or devices shown in the above Figures, among other devices. In various embodiments, some of the method elements shown may be performed concurrently, performed in a different order than shown, or omitted. Additional method elements may also be performed as desired.

In 1902, eye position (or viewpoint) may be received for each or both eyes in world space. As used herein, "position" or "position information" for any object, eyepoint, viewpoint, display and/or plane may include x, y, z information as well as pitch, yaw, and roll information. As used herein, "world space" may include world space coordinates.

In 1904, display position may be received in world space. As used herein, "display" refers to a display device and more particularly, may refer to the imaging surface region of a device.

In 1906, display dimensions may be received in world space.

In 1908, objects may be identified (e.g., the position and/or dimension of the objects) within graphic object space (or virtual space).

In 1910, the frustum may be defined using near and far clipping planes as well as the viewpoint with a perimeter as outlined by the graphic render surface as seen by the viewpoint.

In 1912, a correspondence (e.g., a one to one correspondence) may be established between world space and the graphic object space, where spatial offsets in any direction have a spatial correspondence between the two spaces. More specifically, the virtual viewpoint may be set to correspond to the user's physical viewpoint, which would have a correspondence to each other in the two spaces. Additionally, the display position and dimension information may be used to ensure that the render surface corresponds in position and dimension to the physical display. After establishing all of these values and correspondences in 1902-1912, the method may operate periodically in 1914-1934.

More specifically, in 1914, the physical viewpoint (the position of the user's eyes) of the user may be determined. Additionally, in 1916, the display's physical position/orientation may be determined.

In 1918, the perspective of the user's physical viewpoint to the display's physical position/orientation may be determined.

In 1920, the virtual viewpoint within the graphic space may be defined according to the correspondence to the user's physical viewpoint as defined from the world space.

In 1922, the render surface's position/orientation may be defined in the graphics space according to the display's physical position/orientation.

In 1924, the virtual view volume may be determined based on the determined virtual viewpoint and render surface (as determined from the physical viewpoint and display's physical position/orientation in 1920 and 1922).

In 1926, the position of the render surface or object may be determined based on a) the physical viewpoint to virtual viewpoint correlation; b) the display's physical position to the physical viewpoint, and c) the correspondence determined in 1912. Said another way, the position of the render surface may be determined based on the relationship between the physical viewpoint and the display's physical position/orientation using the correspondence determined in 1912. In other words, the relationship between the physical viewpoint and the physical display may be the same (absolutely or relatively) to the relationship between the virtual viewpoint and the render surface.

In 1928, the orientation of the render surface may be determined (e.g., relative to the virtual viewpoint) within the virtual view volume based on a) the perspective between the physical viewpoint of the user and b) the display's physical position/orientation.

In 1930, the frustum may be sized based on a) the correlation between the physical viewpoint and the virtual viewpoint, b) the perspective established by the physical viewpoint and the display's physical position/orientation, c) the correlation between the render surface's position/orientation and the display's physical position/orientation, and d) the boundary of the render surface thereby defining the virtual view volume. For example, the near and far clipping planes based on the boundary of the rendering object determined of d). From the frustum defined above, an image may be generated by projecting virtual object information within the view volume to the render surface.

The method from 1914-1930 may be repeated in response to changes in the physical viewpoint in 1932 and/or changes in the display's physical position and/or orientation in 1934.

FIG. 20 may operate similarly to FIG. 19; however, in the method of FIG. 20, the stylus is introduced. For example, additional elements 2016-2018, 2022-2024, 2040, and 2042 may be performed. These elements include, as follows:

In 2016, the physical position/orientation of an input device, such as a stylus, or other interactive means may be determined.

In 2018, an object in the virtual space (such as a virtual stylus) that corresponds to the position/orientation of the stylus may be identified. This identification may be one or more of the following: virtual representation of the stylus, an extension representation of the stylus, a graphic object associated with the stylus, a graphic object independent of the object. In addition to the virtual representations are the position, orientation and/or sizing of the virtual representation in the graphic space or more narrowly within the viewpoint to render plane position defined frustum.

In 2022, the position (and orientation of the eye) towards the rendered stylus object that is in proximity to the display may be determined.

In 2024, the eye(s)' position may be determined, e.g., as it views the rendered stylus object or an virtual object being manipulated in the 3D image.

2026-2038 may be performed as described in FIG. 19. In 2040, the stylus may be physically moved and in 2042, the eye(s)' position and/or orientation may change to follow the moved or moving rendered stylus object as viewed within the displays displayed image. Accordingly, the method may be similarly repeated, as in FIG. 19.

The invention claimed is:

1. A method for defining a render surface for a virtual space to present three dimensional (3D) graphic objects using a display, comprising:
    defining a render surface for a virtual space, wherein the render surface corresponds to a physical display used as a plane of projection for 3D graphic objects within the virtual space;
    defining a virtual viewpoint within the virtual space, wherein a relationship between the virtual viewpoint and the render surface is equivalent to a relationship of a user's viewpoint and the physical display;
    defining first frustum boundaries with respect to edges of the render surface, wherein the edges of the render surface correspond to edges and dimensions of the display, wherein the first frustum boundaries comprise a first near clipping plane and a first far clipping plane;
    defining dimensions of the first near and far clipping planes based on intersections of ray traces emanating from the virtual viewpoint and extending through edges of the render surface; and
    displaying the 3D graphic objects on the physical display with a perspective based on the virtual viewpoint.

2. The method of claim 1, further comprising:
    tracking position and orientation of a user with respect to a position and orientation of the physical display, wherein the user's viewpoint is determined based on the position and orientation of the user; and
    wherein defining the virtual viewpoint comprises defining the virtual viewpoint based on the user's viewpoint.

3. The method of claim 2,
    wherein the user's viewpoint is a user's first viewpoint, wherein the virtual viewpoint is a first virtual viewpoint, and wherein the method further comprises:
    updating, based on determining that position and orientation of the user changed, the user's first viewpoint to a user's second viewpoint; and
    defining a second virtual viewpoint based on the user's second viewpoint; and
    displaying the 3D graphic objects on the physical display with a perspective based on the second virtual viewpoint.

4. The method of claim 3, further comprising:
    defining second frustum boundaries with respect to edges of the render surface, wherein the second frustum boundaries comprise a second near clipping plane and a second far clipping plane, wherein dimensions of the second near and second far clipping planes are based on intersections of ray traces emanating from the second virtual viewpoint and extending through edges of the render surface.

5. The method of claim 1,
    wherein the render surface is at a non-normal position and orientation with respect to the virtual viewpoint.

6. The method of claim 1,
    wherein the display comprises a handheld display.

7. A non-transitory computer readable memory medium storing program instructions executable by a processor to:
    define a render surface for a virtual space, wherein the render surface corresponds to a physical display used as a plane of projection for 3D graphic objects within the virtual space;
    define a virtual viewpoint within the virtual space, wherein a relationship between the virtual viewpoint and the render surface is equivalent to a relationship of a user's viewpoint and the physical display;
    define first frustum boundaries with respect to edges of the render surface, wherein the edges of the render surface correspond to edges and dimensions of the display, wherein the first frustum boundaries comprise a first near clipping plane and a first far clipping plane;
    define dimensions of the first near and far clipping planes based on intersections of ray traces emanating from the virtual viewpoint and extending through edges of the render surface; and
    display the 3D graphic objects on the physical display with a perspective based on the virtual viewpoint.

8. The non-transitory computer readable memory medium of claim 7,
    wherein the program instructions are further executable to:
    track position and orientation of a user with respect to a position and orientation of the physical display, wherein the user's viewpoint is determined based on the position and orientation of the user; and
    wherein to define the virtual viewpoint, the program instructions are further executable to define the virtual viewpoint based on the user's viewpoint.

9. The non-transitory computer readable memory medium of claim 8,
    wherein the user's viewpoint is a user's first viewpoint, wherein the virtual viewpoint is a first virtual viewpoint, and wherein the program instructions are further executable to:
    update, based on determining that position and orientation of the user changed, the user's first viewpoint to a user's second viewpoint;
    define a second virtual viewpoint based on the user's second viewpoint; and display the 3D graphic objects on the physical display with a perspective based on the second virtual viewpoint.

10. The non-transitory computer readable memory medium of claim 9,
wherein the program instructions are further executable to:
define second frustum boundaries with respect to edges of the render surface, wherein the second frustum boundaries comprise a second near clipping plane and a second far clipping plane, wherein dimensions of the second near and second far clipping planes are based on intersections of ray traces emanating from the second virtual viewpoint and extending through edges of the render surface.

11. The non-transitory computer readable memory medium of claim 7,
wherein the render surface is at a non-normal position and orientation with respect to the virtual viewpoint.

12. The non-transitory computer readable memory medium of claim 7,
wherein the display comprises a handheld display.

13. A system for defining a render surface for a virtual space to present three dimensional (3D) graphic objects using a display, comprising:
a memory;
a processor in communication with the memory; and
a display in communication with the processor;
wherein the processor is configured to:
define a render surface for a virtual space, wherein the render surface corresponds to a display used as a plane of projection for 3D graphic objects within the virtual space;
define a virtual viewpoint within the virtual space, wherein a relationship between the virtual viewpoint and the render surface is equivalent to a relationship of a user's viewpoint and the display;
define first frustum boundaries with respect to edges of the render surface, wherein the edges of the render surface correspond to edges and dimensions of the display, wherein the first frustum boundaries comprise a first near clipping plane and a first far clipping plane;
define dimensions of the first near and far clipping planes based on intersections of ray traces emanating from the virtual viewpoint and extending through edges of the render surface; and display the 3D graphic objects on the display with a perspective based on the virtual viewpoint.

14. The system of claim 13,
wherein the processor is further configured to:
track, via information received from a tracking system in communication with the system, position and orientation of a user with respect to a position and orientation of the physical display, wherein the user's viewpoint is determined based on the position and orientation of the user; and
wherein to define the virtual viewpoint, the processor is further configured to define the virtual viewpoint based on the user's viewpoint.

15. The system of claim 14,
wherein the system further comprises the tracking system.

16. The system of claim 13,
wherein the user's viewpoint is a user's first viewpoint, wherein the virtual viewpoint is a first virtual viewpoint, and wherein the processor is further configured to:
update, based on determining that position and orientation of the user changed, the user's first viewpoint to a user's second viewpoint; and
define a second virtual viewpoint based on the user's second viewpoint; and
display the 3D graphic objects on the physical display with a perspective based on the second virtual viewpoint.

17. The system of claim 16,
wherein the processor is further configured to:
define second frustum boundaries with respect to edges of the render surface, wherein the second frustum boundaries comprise a second near clipping plane and a second far clipping plane, wherein dimensions of the second near and second far clipping planes are based on intersections of ray traces emanating from the second virtual viewpoint and extending through edges of the render surface.

18. The system of claim 16,
wherein the position and orientation of the user is received from a tracking system in communication with the system.

19. The system of claim 13,
wherein the render surface is at a non-normal position and orientation with respect to the virtual viewpoint.

20. The system of claim 13,
wherein the display comprises a handheld display.

* * * * *